(12) United States Patent
Bugeaud et al.

(10) Patent No.: US 12,201,867 B2
(45) Date of Patent: Jan. 21, 2025

(54) STRAP CONNECTION SYSTEMS, QUICK CONNECTORS, AND RELATED SYSTEMS AND METHODS

(71) Applicant: Rubber Recon Inc., Foothills (CA)

(72) Inventors: Jason P Bugeaud, Foothills (CA); Sasha Kristopher Ivanov, Ardrossan (CA)

(73) Assignee: Rubber Recon Inc., Foothills (CA)

( * ) Notice: Subject to any disclaimer, the term of this patent is extended or adjusted under 35 U.S.C. 154(b) by 202 days.

(21) Appl. No.: 17/624,569

(22) PCT Filed: Feb. 7, 2020

(86) PCT No.: PCT/CA2020/050923
§ 371 (c)(1),
(2) Date: Jan. 3, 2022

(87) PCT Pub. No.: WO2021/000048
PCT Pub. Date: Jan. 7, 2021

(65) Prior Publication Data
US 2022/0362614 A1 Nov. 17, 2022

(30) Foreign Application Priority Data
Jul. 20, 2019 (CA) ..................... 3048519

(51) Int. Cl.
*A63B 21/055* (2006.01)
*A63B 21/04* (2006.01)
*F16B 45/00* (2006.01)

(52) U.S. Cl.
CPC ...... *A63B 21/0557* (2013.01); *A63B 21/0442* (2013.01); *F16B 45/002* (2021.05)

(58) Field of Classification Search
CPC ... A63B 21/0557; A63B 21/0442; A63B 6/00; A63B 21/0552; A63B 2209/08;
(Continued)

(56) References Cited

U.S. PATENT DOCUMENTS

| | | | |
|---|---|---|---|
| 3,860,209 | A | 1/1975 | Strecker |
| 4,400,856 | A | 8/1983 | Tseng |

(Continued)

FOREIGN PATENT DOCUMENTS

| | | |
|---|---|---|
| CA | 2715413 | 3/2009 |
| CA | 2917239 | 7/2016 |

(Continued)

OTHER PUBLICATIONS

Rogue Fitness, RML-390F Flat Foot Monster Lite Rack, URL = https://www.roguecanada.ca/rml-390f-flat-foot-monster-lite-rack, available at least as early as Jun. 22, 2014, obtained via Wayback Machine Jan. 17, 2024, 4 pages.
(Continued)

*Primary Examiner* — Andrew S Lo
(74) *Attorney, Agent, or Firm* — Robert A. Nissen

(57) ABSTRACT

A male-female quick connect system is described, along with related methods and uses. Example applications include using the strap as an exercise resistance trainer band, a boating mooring connector, a replacement or supplement to freight transport tie-downs, and others. An interchangeable strap connection system is described, having: a male connector; a strap connected to the male connector; a plurality of female sockets spaced from one another and anchored to a substrate, with each female socket structured to permit the male connector to interchangeably quick connect with and quick release from the female socket.

21 Claims, 23 Drawing Sheets

(58) Field of Classification Search
CPC ............. A63B 2209/10; A63B 2225/09; F16B 45/002; F16B 21/04; F16B 45/00; F16B 45/02; F16B 21/02; B60P 7/08
See application file for complete search history.

(56) References Cited

U.S. PATENT DOCUMENTS

| | | | |
|---|---|---|---|
| 4,457,650 A | 7/1984 | Tseng | |
| 4,630,982 A | 12/1986 | Fenner | |
| 4,661,009 A | 4/1987 | Tripp | |
| 5,044,856 A | 9/1991 | Jerabek | |
| 5,342,126 A | 8/1994 | Heston et al. | |
| 5,370,488 A | 12/1994 | Sykes | |
| 5,433,688 A | 7/1995 | Davies | |
| 5,511,919 A | 4/1996 | Scalise | |
| 5,626,546 A * | 5/1997 | Little | A63B 21/4001 482/904 |
| 5,690,042 A | 11/1997 | Bentley | |
| 6,202,263 B1 * | 3/2001 | Harker | B62J 7/08 2/237 |
| 6,220,994 B1 * | 4/2001 | Rich | A63B 23/03508 482/130 |
| 6,261,042 B1 | 7/2001 | Pratt | |
| 6,267,543 B1 | 7/2001 | David et al. | |
| 6,318,941 B1 | 11/2001 | Guenther | |
| 6,558,301 B1 * | 5/2003 | Jackson | A63B 21/155 482/121 |
| 6,588,241 B1 | 7/2003 | Murray, Jr. et al. | |
| 6,626,801 B2 * | 9/2003 | Marques | A63B 21/0552 482/23 |
| 7,100,403 B2 | 9/2006 | Murray, Jr. et al. | |
| 7,229,392 B2 * | 6/2007 | Turnbull | A63B 21/4013 482/904 |
| 7,438,674 B2 | 10/2008 | Sjödin | |
| 7,625,325 B1 * | 12/2009 | Yost | A63B 21/169 482/904 |
| 7,857,739 B2 * | 12/2010 | Caldwell | A63B 21/00047 482/133 |
| 8,029,222 B2 | 10/2011 | Nitsche | |
| 8,057,370 B2 | 11/2011 | Dunn | |
| 8,870,722 B2 * | 10/2014 | Kassel | A63B 21/4015 482/121 |
| 8,979,397 B2 | 3/2015 | Henry | |
| 8,979,716 B1 | 3/2015 | Rawlins | |
| 9,314,658 B2 * | 4/2016 | Kaye | A63B 23/03508 |
| 10,159,866 B2 * | 12/2018 | Carter | A63B 23/03541 |
| 2003/0159476 A1 | 8/2003 | Bellow, Jr. et al. | |
| 2005/0059537 A1 | 3/2005 | Hull | |
| 2005/0218758 A1 | 10/2005 | Thackery et al. | |
| 2006/0128540 A1 * | 6/2006 | Engle | A63B 21/16 482/121 |
| 2006/0135329 A1 * | 6/2006 | Owen | A63B 21/04 482/121 |
| 2006/0160681 A1 * | 7/2006 | McBride | A63B 1/00 482/129 |
| 2007/0060454 A1 * | 3/2007 | Vogel | A63B 21/0552 482/121 |
| 2007/0087920 A1 * | 4/2007 | Dachraoui | A63B 21/0552 482/121 |
| 2008/0113852 A1 * | 5/2008 | Caldwell | A63B 21/4043 482/133 |
| 2008/0171643 A1 * | 7/2008 | Baudhuin | A63B 22/0087 482/148 |
| 2009/0044388 A1 * | 2/2009 | Kao | A45F 3/14 24/629 |
| 2009/0097911 A1 * | 4/2009 | Chuang | G06F 1/1628 70/57 |
| 2009/0215594 A1 * | 8/2009 | Panaiotov | A63B 21/16 482/130 |
| 2010/0096834 A1 | 4/2010 | Stanifer et al. | |
| 2011/0224055 A1 | 9/2011 | Kassel | |
| 2011/0237410 A1 * | 9/2011 | Perez | A63B 21/0442 482/129 |
| 2011/0312477 A1 * | 12/2011 | Wiseman | A63B 21/0442 482/126 |
| 2013/0324378 A1 * | 12/2013 | Rountree | A63B 21/1645 482/129 |
| 2014/0031182 A1 * | 1/2014 | Donofrio | A63B 21/0552 482/129 |
| 2014/0087928 A1 * | 3/2014 | Luedeka | A63B 21/4023 482/130 |
| 2014/0329650 A1 * | 11/2014 | Watry | A63B 69/0093 482/139 |
| 2015/0024911 A1 * | 1/2015 | Ross | A63B 23/1236 482/129 |
| 2015/0251039 A1 * | 9/2015 | Mikulski | A63B 21/0442 482/126 |
| 2015/0273263 A1 * | 10/2015 | Guttman | A63B 21/068 482/129 |
| 2017/0028245 A1 | 2/2017 | Williams | |
| 2017/0056702 A1 * | 3/2017 | Carter | A63B 21/0442 |
| 2017/0252598 A1 * | 9/2017 | Ross | A63B 21/00065 |
| 2018/0028854 A1 * | 2/2018 | Carter | A63B 23/1209 |

FOREIGN PATENT DOCUMENTS

| | | |
|---|---|---|
| EP | 0591186 | 4/1994 |
| EP | 3382216 | 10/2018 |
| GB | 2269848 | 2/1994 |

OTHER PUBLICATIONS

Jim Stoppani, Elastic Resistance Vs. Free Weights, URL = https://bodylastics.com/elastic-resistance-vs-free-weights-by-jim-stoppani-phd/, obtained Jun. 26, 2019, 12 pages.
Wikipedia, Bayonet mount, URL = https://en.wikipedia.org/wiki/Bayonet_mount, obtained Apr. 4, 2019, 5 pages.
Rogue Canada, Proloc Blocker, URL = https://www.roguecanada.ca/proloc-blocker, obtained Jun. 26, 2019, 7 pages.
Patent Cooperation Treaty, Written Opinion of the International Searching Authority of application No. PCT/CA2020/050923, Sep. 30, 2020, 7 pages.
Patent Cooperation Treaty, International Search Report of application No. PCT/CA2020/050923, Sep. 30, 2020, 6 pages.

* cited by examiner

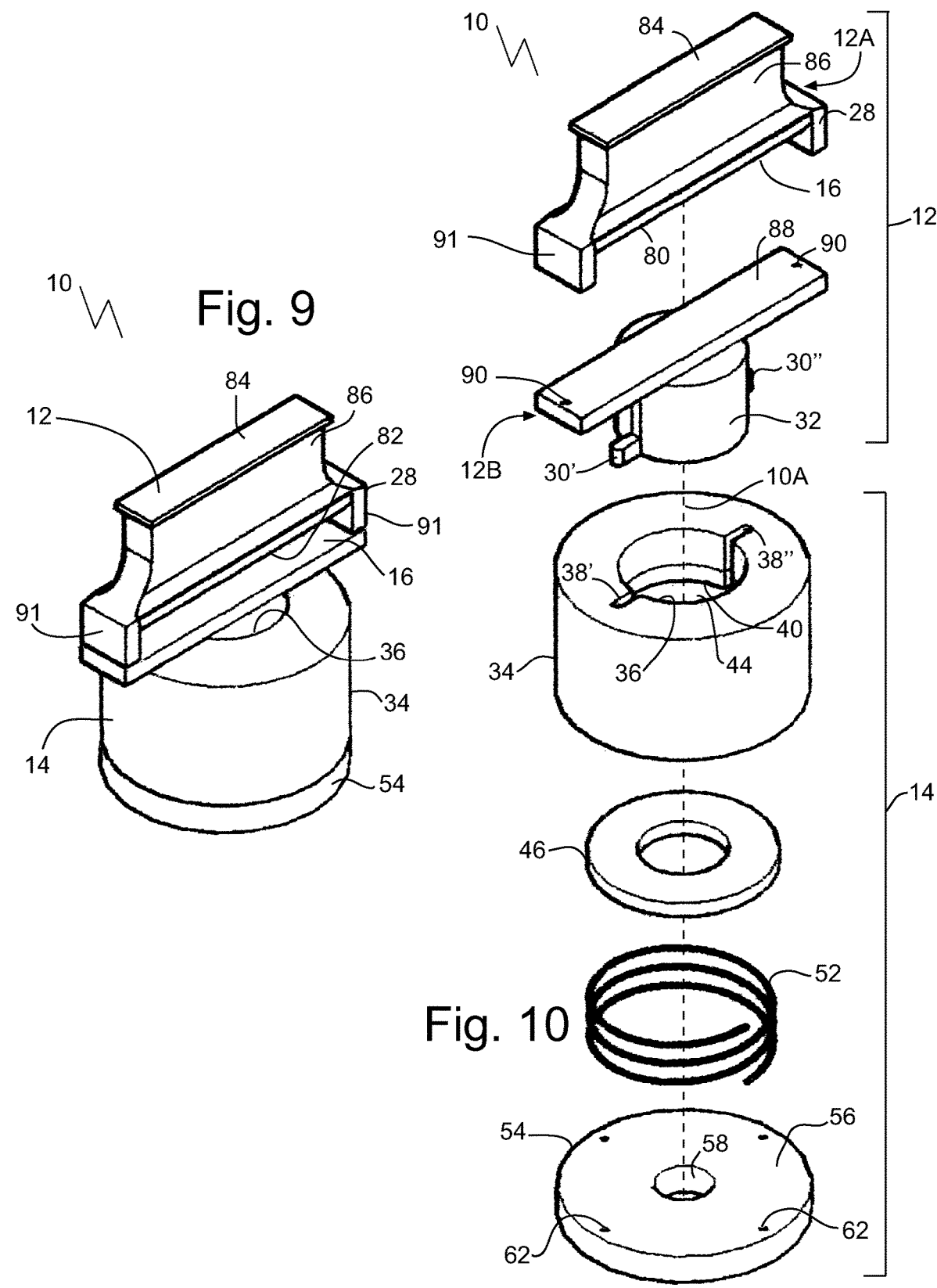

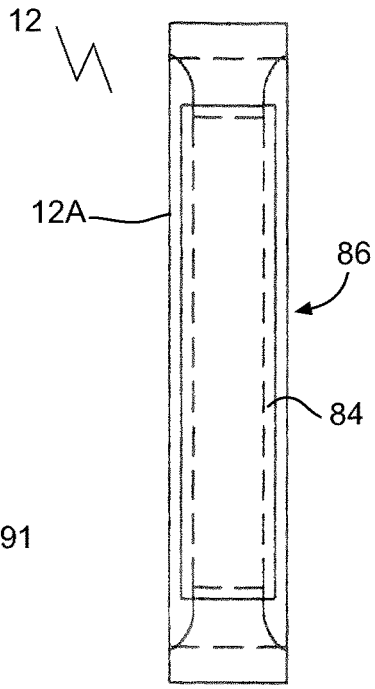
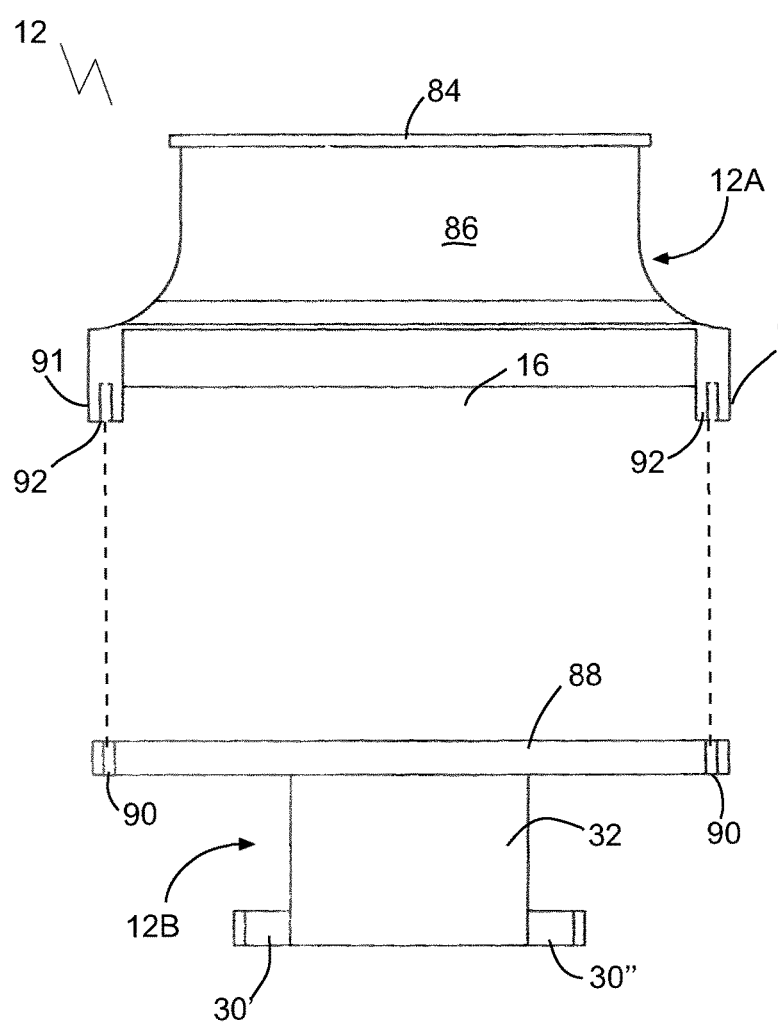

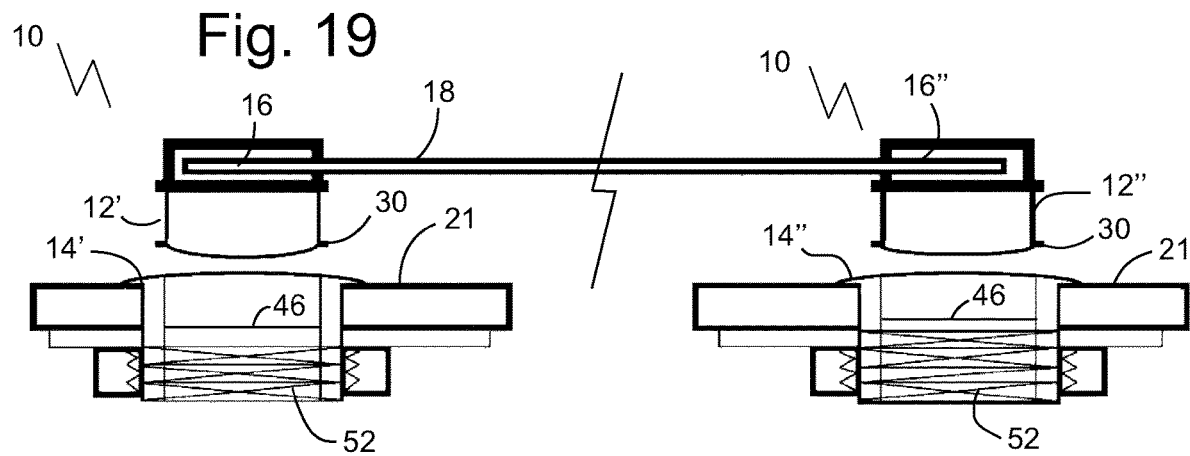
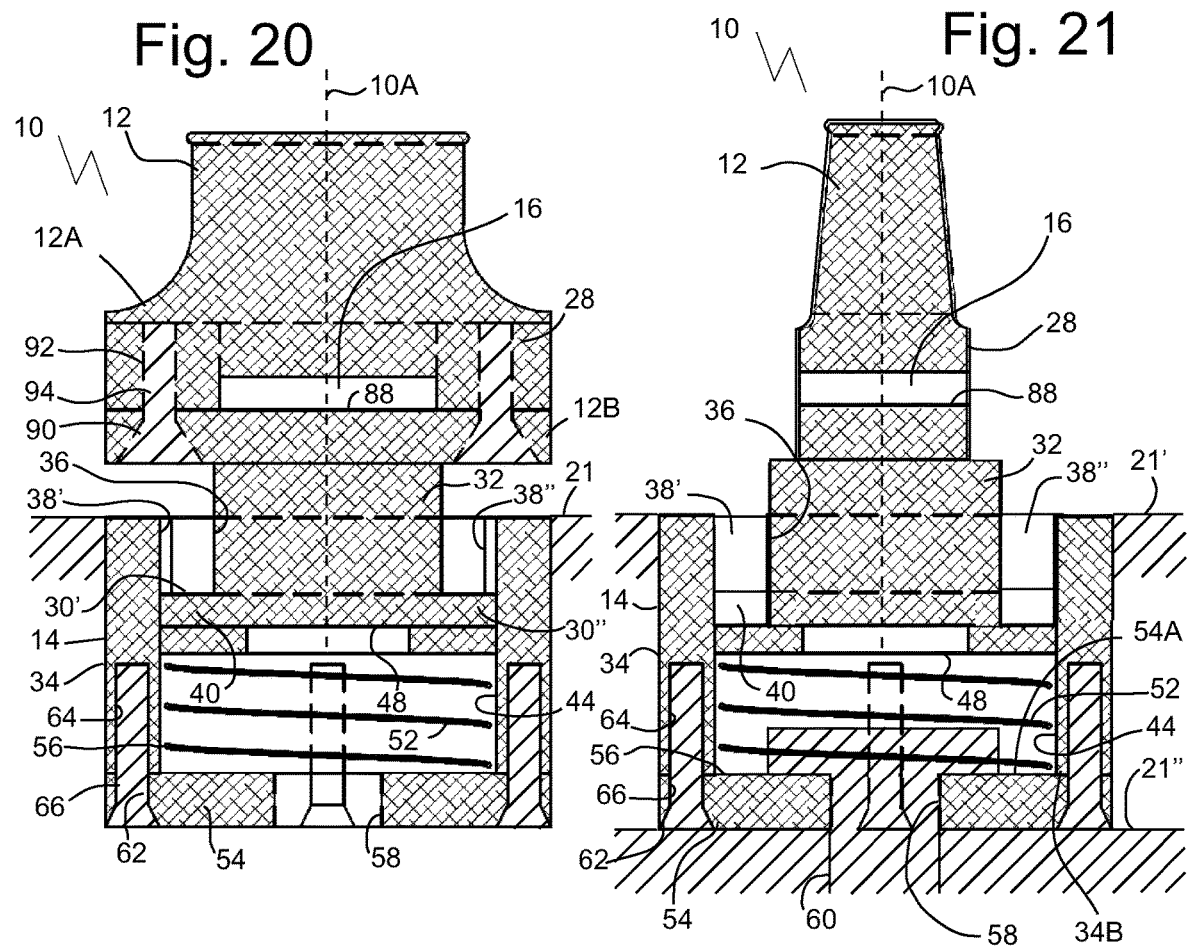

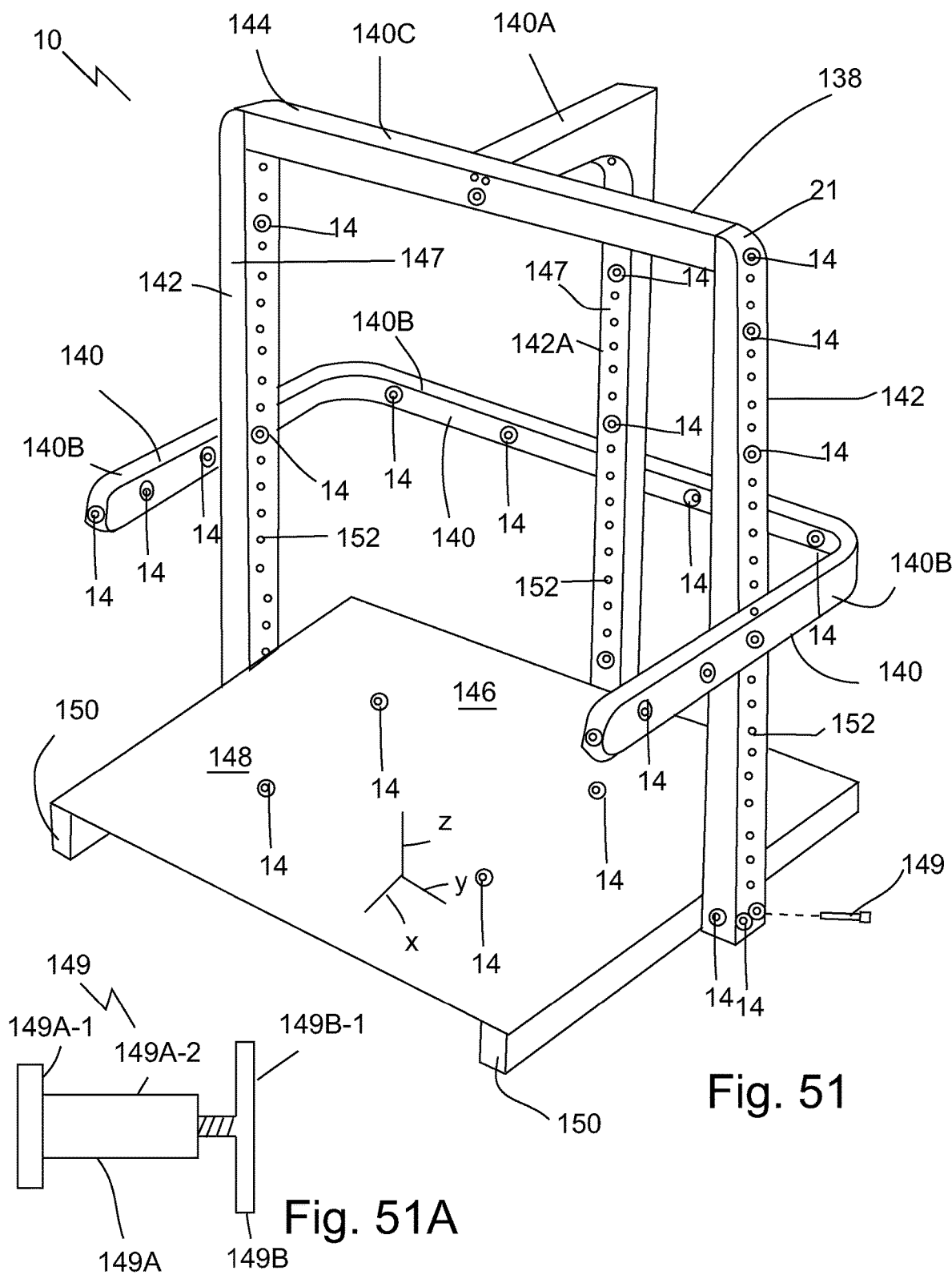

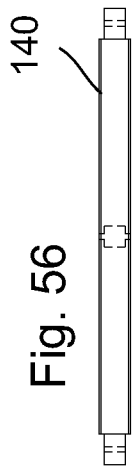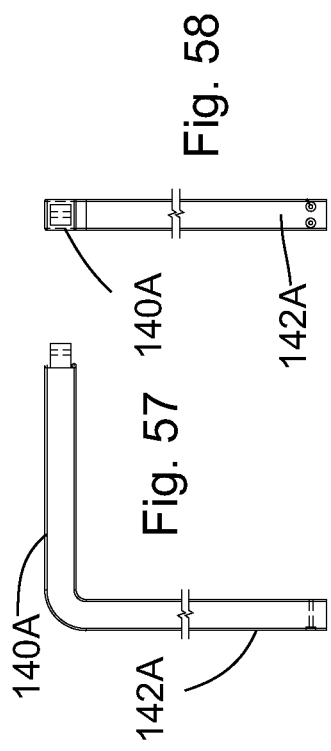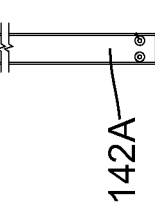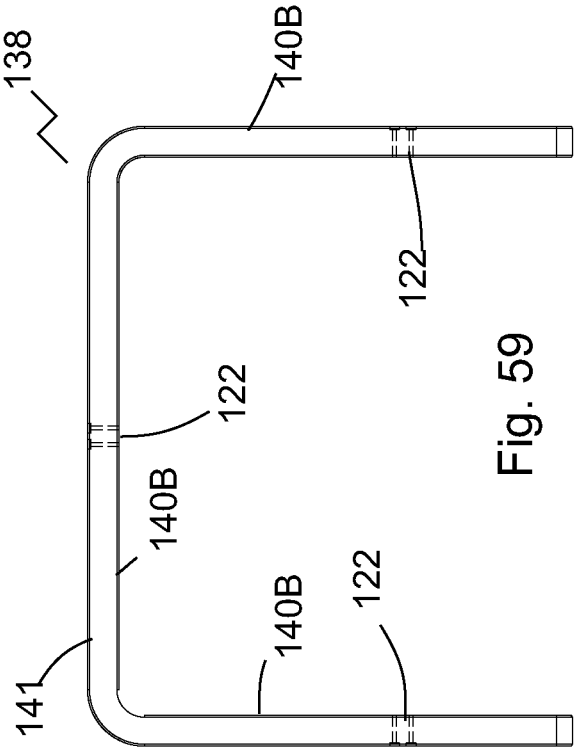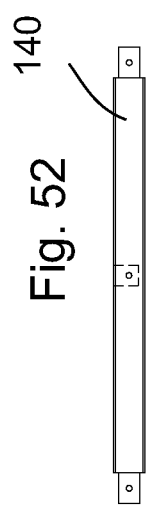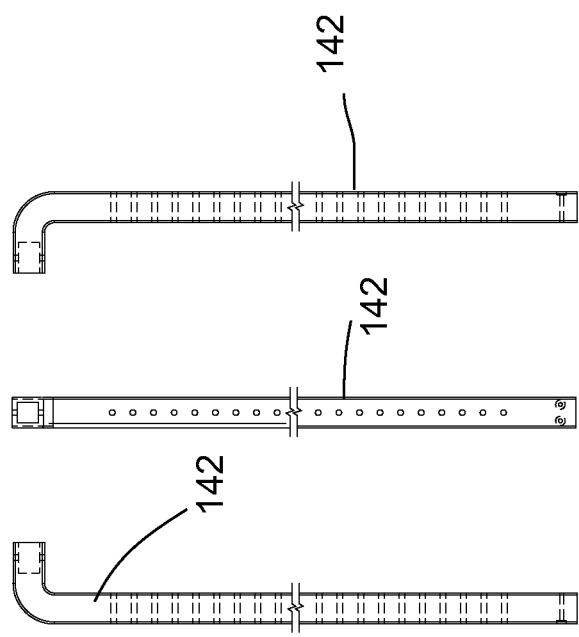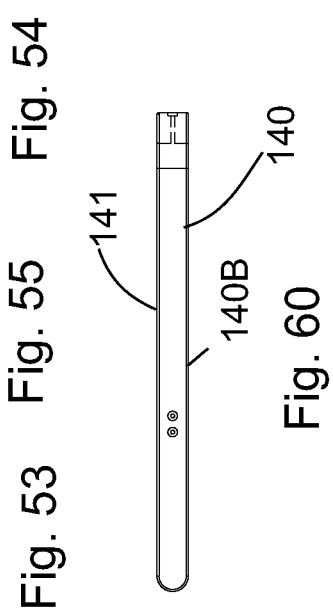

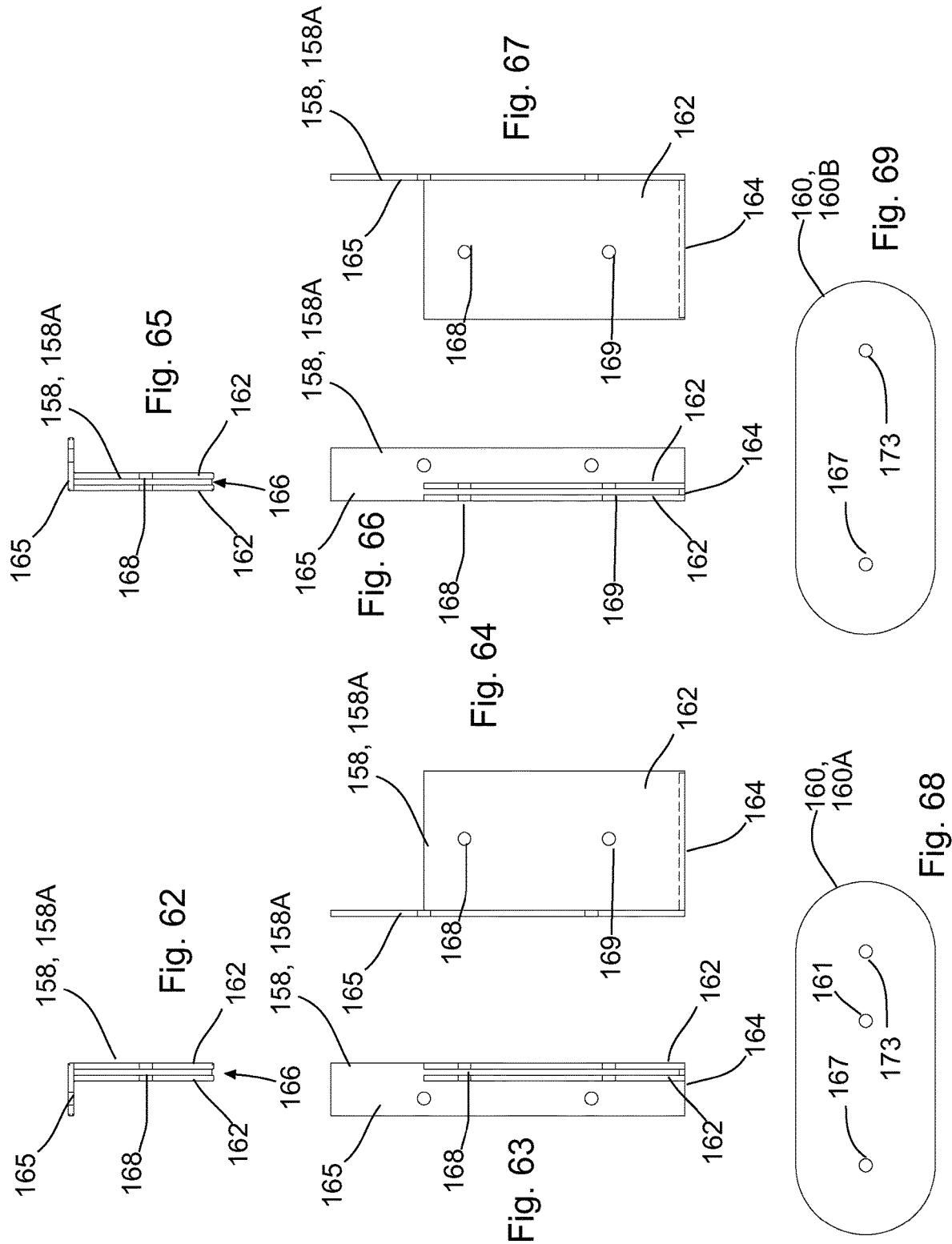

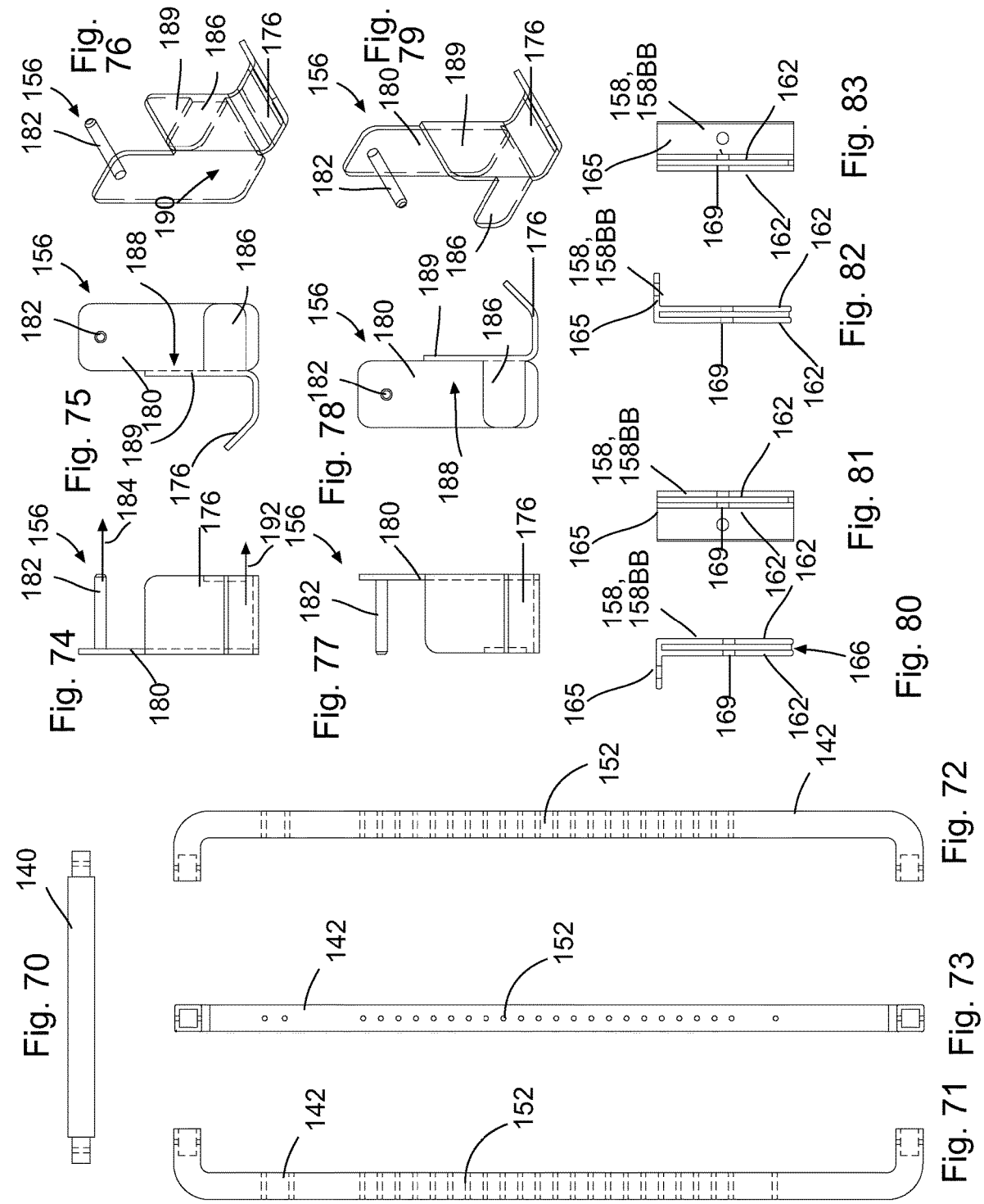

STRAP CONNECTION SYSTEMS, QUICK CONNECTORS, AND RELATED SYSTEMS AND METHODS

TECHNICAL FIELD

This document relates to strap connection systems, quick connectors, and related systems and methods.

BACKGROUND

Quick connect and release connectors are known. A bayonet connector is one style of these connectors. Other styles include camlock, ball bearing, latch, and other types of connectors. Quick connect straps are known for securing electrical equipment and connecting to handbags, among other uses.

SUMMARY

A male-female quick connect system is disclosed, along with related methods and uses. Example applications include using the strap as an exercise resistance trainer band, a boating mooring connector, a replacement or supplement to freight transport tie-downs, and others.

An interchangeable strap connection system is disclosed comprising: a male connector; a strap connected to the male connector; a plurality of female sockets spaced from one another and anchored to a substrate, with each female socket structured to permit the male connector to interchangeably quick connect with and quick release from the female socket.

A method is disclosed of using an interchangeable strap connection system further comprising quick connecting a male connector into, or quick releasing the male connector out of, one of a plurality of female sockets.

A resistance strap exercise system is disclosed comprising: a first connector; an elastomeric strap connected to the first connector; and a plurality of second connectors spaced from one another and anchored to a substrate, with each second connector structured to permit the first connector to interchangeably quick connect with and quick release from the second connector. A resistance strap exercise system is disclosed comprising: an elastomeric strap; and a weight bar collar connected to the elastomeric strap. A strap exercise system is disclosed comprising: a weight bar collar formed of a spool with a sleeve and opposed end flanges; a locking part that extends between the opposed end flanges and is spaced over an external cylindrical surface of the sleeve to secure in use a strap in between the locking part, the external surface, and the opposed end flanges. A method is disclosed of operating a resistance strap exercise system comprising applying tension to elongate the elastomeric strap.

A resistance strap exercise system is disclosed comprising: an elastomeric strap; a handle; and a hook connected to the handle, the hook defining a strap passage, with a strap insertion slot that is sized to: receive or release the elastomeric strap in a direction transverse the elastomeric strap when the elastomeric strap is in an elongated configuration under tension, and block the elastomeric strap when the elastomeric strap is in a neutral configuration. A method of operating a resistance strap exercise system is disclosed comprising: applying tension to an elastomeric strap to place the elastomeric strap in an elongated configuration; and passing the elastomeric strap in a direction transverse the elastomeric strap into or out of a strap passage of a hook via a strap insertion slot.

An exercise rack system is disclosed comprising: a structural frame formed by columns and beams, in which the columns, beams, or both the columns and beams have a series of sockets structured to receive weight bar supports or strap connectors; wall mounting brackets; and swing arms, each swing arm pivotally mounted between a respective wall mounting bracket and the structural frame, the swing arms configured to fold the structural frame up and down relative to the wall mounting brackets to move the structural frame between a deployed, laterally extended configuration, and a stowed, laterally retracted position. A method is disclosed comprising folding an exercise rack system between the deployed, laterally extended configuration, and the stowed, laterally retracted position.

A weight bar support is disclosed comprising: a J-hook defining a weight bar support at a front face of the J-hook; a support arm extended rearwardly past, for example from, a rear face of the J-hook; and an exercise rack engaging pin extended in a lateral direction from the support arm. A method is disclosed comprising connecting a weight bar support with a lateral pin to a column of an exercise rack.

Polymeric light-weight and relatively strong (as compared to steel or aluminum) materials may be used to construct weight bars exercise racks, and related components, such as connectors. A weight bar or exercise rack is disclosed formed of structural members that comprise a polymeric material reinforced with carbon or glass fiber. A weight bar or exercise rack is disclosed formed of structural members that Nylon –6,6.

A boat mooring system is disclosed comprising: a male connector; a strap connected to the male connector; and a female socket anchored to one of a boat or a dock adjacent the boat, with the strap anchored to the other of the boat or dock, with the female socket structured to permit the male connector to quick connect with and quick release from the female socket.

A method is disclosed of operating a boat mooring system further comprising quick connecting the male connector into, or quick releasing the male connector out of, the female socket.

A cargo securing system is disclosed comprising: a male connector; a strap connected to the male connector; and a female socket anchored to a wheeled trailer flatbed, rail car, or transport container, with the strap anchored to the wheeled trailer flatbed, rail car, or transport container, with the female socket structured to permit the male connector to quick connect with and quick release from the female socket.

A method is disclosed of operating a boat mooring system further comprising quick connecting the male connector into, or quick releasing the male connector out of, the female socket.

In various embodiments, there may be included any one or more of the following features: The plurality of female sockets are embedded within the substrate. The substrate is one or more of a wall, a floor, or a ceiling, of a room. The substrate comprises an exercise rack. The exercise rack is formed of beams and columns that form a cage defining an exercise zone. The cage comprises a C-shaped beam that defines the exercise zone. The first column mounts an overhead beam above both the exercise zone and the C-shaped beam. The plurality of female sockets are spaced on, for example along, the beams and columns of the cage. The plurality of female sockets are arranged in a matrix on the substrate. The male connector has a shaft with a radial latch part or pin; each female socket of the plurality of female sockets defines a slot shaped to receive the shaft and radial latch part, along a shaft axis of the shaft, when the shaft and radial latch part are angularly aligned with the slot; and each female socket is structured to catch the radial latch part after insertion and rotation to prevent removal of the shaft from the slot. The shaft has diametrically opposed radial latch pins. Each female socket comprises: a socket body that defines an axial bore, with the slot being defined axially through a plate that extends transversely across the axial bore; and in which an undersurface of the plate defines a stop for the radial latch part to prevent the radial latch part from aligning with the slot. The undersurface defines an arcuate channel whose radial ends define the stop. Each female socket comprises a biasing device that biases the radial latch part into engagement with the undersurface. The biasing device comprises a spring. The male connector is structured to quick release upon axially depressing the male connector further into the slot against the biasing force of the biasing device, and rotating the shaft such that the radial latch part aligns with the slot. A base of each female socket is defined by a base plate that is secured to the socket body. The base plate is secured to the socket body by a fastener. The base plate defines a fastener bore, with the fastener bore being defined axially through the base plate and through which passes a fastener that anchors the base plate to the substrate. The male connector receives the strap through a strap aperture through the male connector. The strap aperture is defined between a first part and a second part of the male connector, in which the first part and the second part are secured together in a closed position by fasteners, latches, or hinges. The strap is elastomeric. Forming a resistance strap exercise system. The handle comprises a bar. The hook connects to the bar via a collar around the bar. The collar is mounted to rotate about the bar. The hook has one or more rigid pincer jaws in spaced and fixed configuration to define the strap insertion slot. A first connector, with the elastomeric strap being connected to the first connector; and a plurality of second connectors spaced from one another and anchored to a substrate, with each second connector structured to permit the first connector to interchangeably quick connect with and quick release from the second connector. The wall mounting brackets have side walls and a base shelf defining a swing arm receiving channel. The side walls of one or more mounting brackets and its respective swing arm have apertures that align when the exercise rack is in the stowed, laterally retracted position to receive a locking pin. The columns and beams are arranged in a rectangle. A strap connected to a first connector, in which the series of sockets comprise second connectors, and the second connectors are structured to permit the first connector to interchangeably quick connect with and quick release from the second connectors. The series of sockets comprise third connectors, which are structured to receive weight bar supports. The second connectors are arrayed in series along front faces of the columns and the beams, and the third connectors are arrayed in series along side faces of the columns Weight bar supports that each comprise: a J-hook that defines a weight bar support on a front face of the columns; and a pin extended in a lateral direction into a respective third connector. The wall mounting brackets are mounted to a wall. The support arm is a first support arm, and comprising a second support arm extended rearwardly past the rear face of the J-hook, such that the first support arm, the second support arm, and the rear face of the J-hook define a rack column receiving channel. The J-hook and support arm form plates. The exercise rack engaging pin extends normal to the support arm and parallel to a weight bar axis defined by the weight bar support. The exercise rack engaging pin is mounted such that, when the weight bar support is mounted to a vertical column of an exercise rack, the exercise rack engaging pin is vertically higher than the weight bar support. The plurality of female sockets are mounted at different locations on a boat and a dock adjacent the boat. The plurality of female sockets are mounted at different locations on a wheeled trailer flatbed, rail car, or transport container. A pair of male connectors, with the strap connected between the pair of male connectors, in which each female socket of the plurality of female sockets are structured to permit both of the pair of male connectors to interchangeably quick connect with and quick release from the female socket. Quick connecting the male connector into, or quick releasing the male connector out of, one of the plurality of female sockets. The plurality of female sockets are located on a vehicle, for example a bus (such as a tour bus for a musician). The plurality of female sockets are located on a military vehicle or on military equipment. A weight bar collar connected to the strap. A first connector, with the elastomeric strap being connected to the first connector; and a plurality of second connectors spaced from one another and anchored to a substrate, with each second connector structured to permit the first connector to interchangeably quick connect with and quick release from the second connector. The strap, female socket, or male connector, is connected to a boat fender. The boat fender is suspended by a second strap from the male connector or female socket. The boat fender is connected to the boat.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 9 is a perspective view of another embodiment of a connector system in a locked position.

FIG. 10 is an exploded perspective view of the connector system of FIG. 9.

FIG. 11 is an exploded side elevation view of the male quick connector of the connector system of FIG. 9.

FIG. 12 is a top plan view of the upper portion of the male quick connector of the connector system of FIG. 9.

FIG. 13 is a top plan view of the lower portion of the male quick connector of the connector system of FIG. 9.

FIG. 17A is a side elevation view of a bar handle incorporated in the system of FIG. 17.

FIG. 17B is a side elevation view of a barbell weight bar and weight bar collar incorporated into the system of FIG. 17.

FIG. 19 is a side section view of the connector system of FIG. 9 with a pair of male connectors located on either end of the strap, with each male connector aligned to mate with a respective female socket to secure the strap at two locations.

FIG. 20 is a cross-sectional view of another embodiment of a connector system in an inserted but unlocked position.

FIG. 21 is a cross-sectional view of the connector system of FIG. 20 in a locked position.

FIG. 51 is a perspective view of an exercise rack configured in a cage, and incorporating the connector system disclosed herein.

FIG. 51A is an example pin for securing the parts of the cage of FIG. 51 together.

FIG. 52 is a top plan view of a top cross beam of the rack of FIG. 51.

FIGS. 53 and 54 are side elevation views of left and right columns of the rack of FIG. 51, with internal weight bar support sockets shown in dashed lines.

FIG. 55 is a further side elevation view of the columns of FIG. 53 or 54.

FIG. 56 is a cross sectional view of the top cross beam of FIG. 52.

FIGS. 57 and 58 are side elevation and cross sectional views of a rear support member (beam and column) of the rack of FIG. 51.

FIG. 59 is a top plan view of a set of beams forming a C-shape in the rack of FIG. 51.

FIG. 60 is a side elevation view of the set of beams of FIG. 59.

FIGS. 62-64 are top plan, end elevation, and side elevation views, respectively, of a left upper wall mounting bracket in the system of FIG. 61.

FIGS. 65-67 are top plan, end elevation, and side elevation views, respectively, of a right upper wall mounting bracket in the system of FIG. 61.

FIGS. 68 and 69 are side elevation views of the plate swing arms of the system of FIG. 61.

FIG. 70 is a top plan view of a cross member beam of the rack of FIG. 61.

FIGS. 71 and 72 are side elevation views of left and right upright columns of the rack of FIG. 61, with internal weight bar support sockets shown in dashed lines.

FIG. 73 is a side elevation view of both the columns of FIGS. 71 and 72.

FIGS. 74-76 are end elevation, side elevation, and perspective views, respectively, of a left handed weight bar support from the system of FIG. 61.

FIGS. 77-79 are end elevation, side elevation, and perspective views, respectively, of a left handed weight bar support from the system of FIG. 61.

FIGS. 80-81 are top plan and side elevation views, respectively, of a left lower wall mounting bracket in the system of FIG. 61.

FIGS. 82-83 are top plan and side elevation views, respectively, of a right lower wall mounting bracket in the system of FIG. 61.

DETAILED DESCRIPTION

Immaterial modifications may be made to the embodiments described here without departing from what is covered by the claims.

A fastener is a hardware device that mechanically joins or affixes two or more objects together. In general, fasteners are used to create non-permanent joints, that is, joints that can be removed or dismantled without damaging the joining components. Welding is an example of a method of creating permanent joints. Several other alternative methods of joining materials include: crimping, welding, soldering, brazing, taping, gluing, cement, or the use of other adhesives. Non-permanent joints may be created using forces, such as with magnets, vacuum (suction cups), or even friction (such as sticky pads or interference fits). Some types of woodworking joints make use of separate internal reinforcements, such as dowels or biscuits, which in a sense can be considered fasteners within the scope of the joint system, although on their own they are not general purpose fasteners.

Quick connectors may be used in fluid line couplings. An example of a quick connector is a quick connect fitting, also called a quick disconnect or quick release coupling. These are couplings used to provide a fast, make-or-break connection of fluid transfer lines. Operated by hand, quick connect fittings replace threaded or flanged connections, which require wrenches. When equipped with self-sealing valves, quick connect fittings will, upon disconnection, automatically contain any fluid in the line. A cam and groove coupling, also called a camlock fitting, is a form of hose coupling. This kind of coupling is popular because it is a simple and reliable means of connecting and disconnecting hoses quickly and without tools.

Other types of quick connectors are used in industry, such as magnetic connectors, hook and loop connectors, buckles, over-the-center latches and other latches, snap fasteners, and others.

A bayonet mount or bayonet connector is a fastening mechanism consisting of a cylindrical male side with one or more radial parts or pins, and a female receptor with corresponding L-shaped slot(s) (or another suitable shape such as a ramp) with spring(s) to keep the two parts locked together. The slots may be shaped like a capital letter L with a serif (a short upward segment at the end of the horizontal arm). In use the pin slides into the vertical arm of the L, rotates across the horizontal arm, then is pushed slightly upwards into the short vertical "serif" by the spring. Once in the serif the connector is no longer free to rotate unless pushed down against the spring until the pin is out of the "serif".

Figure 14:
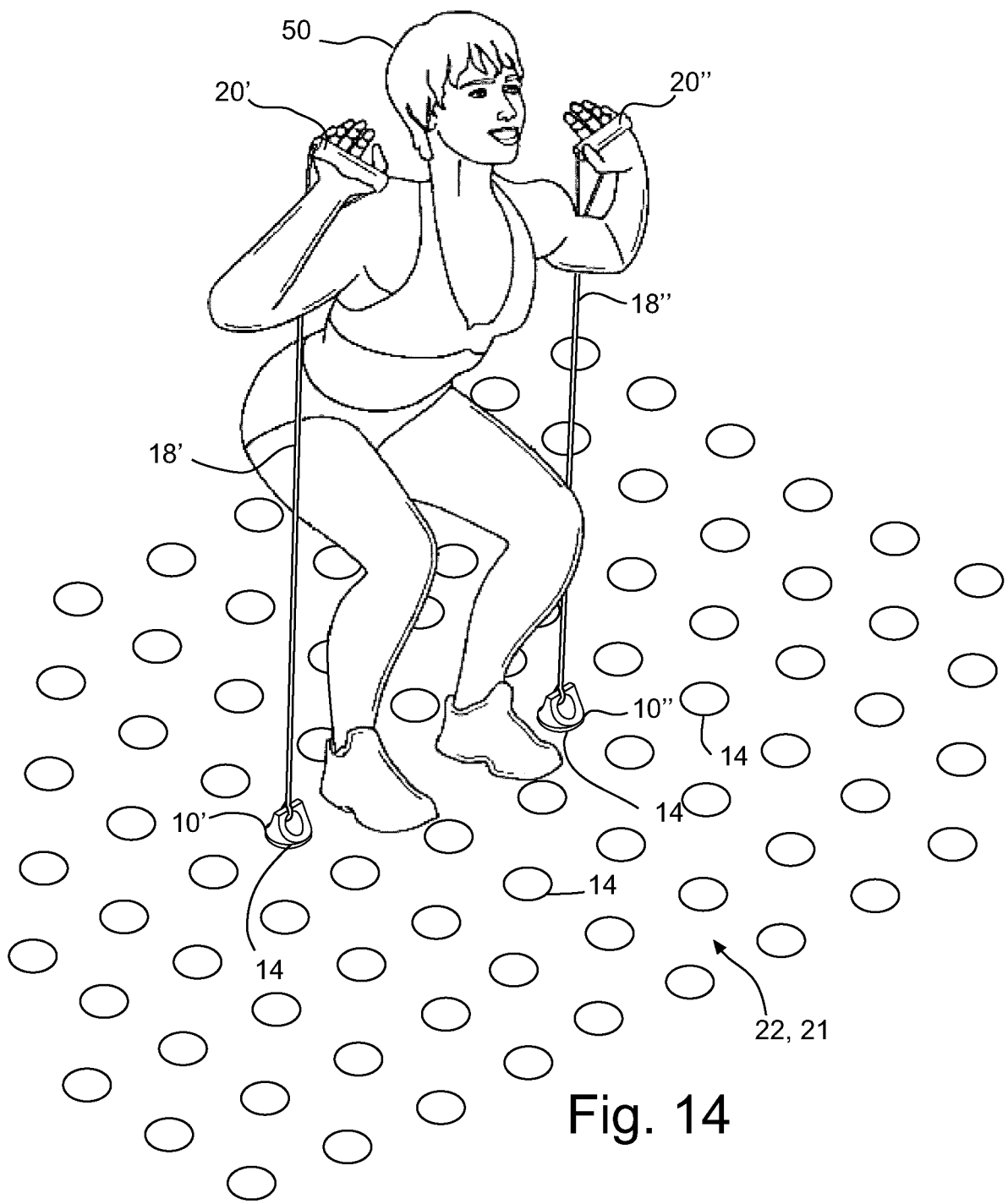
FIG. 14 is a perspective view of a person in a room using the connector system of FIG. 1 to connect two resistance bands to the floor to carry out a squat exercise.

Referring to FIGS. 1-6, a connection system 10 is illustrated. Connection system 10 comprises a male connector 12, and a female socket 14. The male quick connector 12 may include a shaft 32 with a radial latch pin 30, for example diametrically opposed radial latch pins 30. In this document, reference characters referred to in the description may appear in the respective drawings with Roman numeral superscripts to delineate between multiple instances of the same part shown in the drawing. Referring to FIG. 14, in some embodiments, the system 10 has a plurality of female sockets 14, and forms an interchangeable connection system where the male quick connector can be interchangeably connected to any of the female sockets 14. The plurality of female sockets 14 spaced from one another and each structured to quick connect with and quick release from the male quick connector 12. The plurality of female sockets 14 may be anchored at different locations on a substrate 21, for example a fixed substrate such as a floor of a building as shown.

Referring to FIGS. 1-4 and 14, a strap 18 may be connected to the male connector 12. In some cases a handle grip 20 may be provided on the strap 18 for a user to grasp to apply tension to the strap 18 after connecting the connector 12 and socket 14. A strap, sometimes also called a strop, may be an elongated flap, rope, or ribbon, made of a suitable material such as fabric, leather, or elastomeric polymer or rubber. Thin straps are used as part of clothing or baggage, or bedding such as in a sleeping bag, while thicker straps may be used in similar applications, for example in the case of a belt. A webbing may be a particular type of strap that is a strong fabric woven as a flat strip or tube that is also often used in place of rope. Modern webbing is typically made from exceptionally high-strength material, and is used in automobile seat belts, furniture manufacturing, transportation, towing, military apparel, cargo fasteners, and many other fields.

Figure 5:
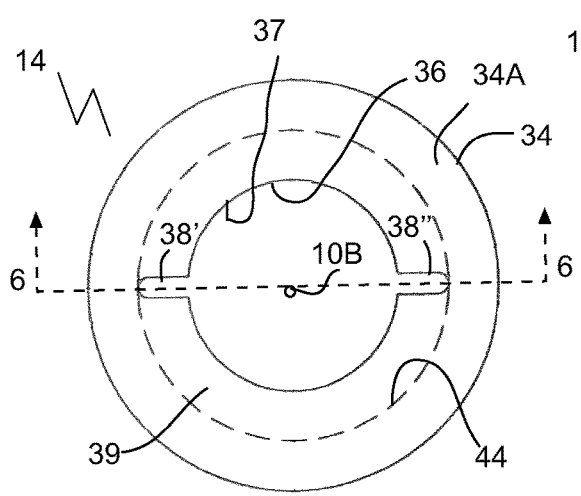
FIG. 5 is a top plan view of the female socket of the connector system of FIG. 1.
Figure 6:
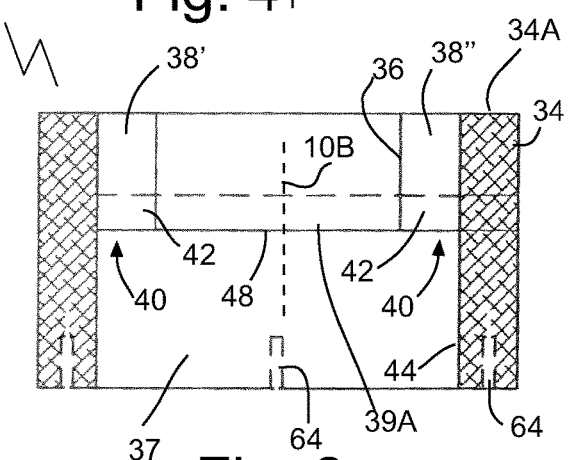
FIG. 6 is a section view taken along the 6-6 section lines from FIG. 5.
Figure 7:
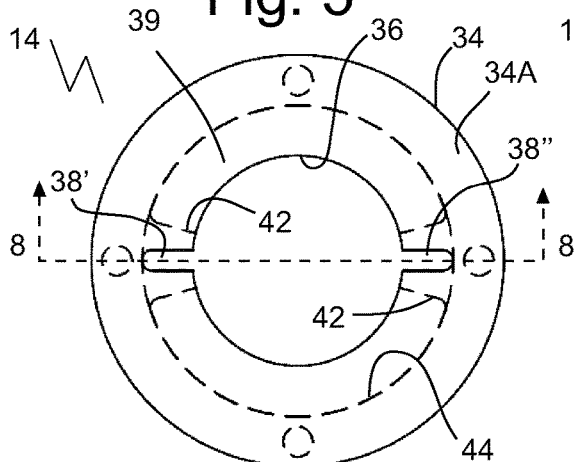
FIG. 7 is a top plan view of the female socket of another embodiment of a connector system.
Figure 8:
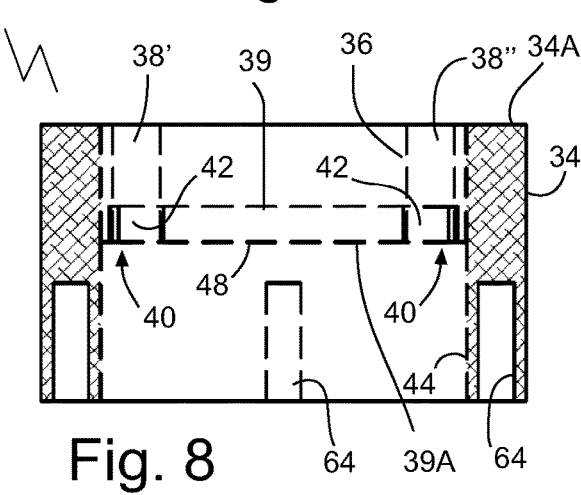
FIG. 8 is a section view taken along the 8-8 section lines from FIG. 7.

Referring to FIGS. 2-8, 10-13, 18, and 20-21, the male quick connector 12 of the connection system 10 may have a suitable structure. The connector 12 may include a shaft 32. The shaft 32 may further include a radial latch pin 30, for example two or more pins 30 (two are shown in the figures). Referring to FIGS. 2-6, the pins 30 may be considered radial because they extend in radial directions relative to an axis 10A of the of the shaft 32. The female socket 14 of the plurality of female sockets 14 may include a slot 36. The slot 36 may be shaped to permit the shaft 32 and radial latch pin 30 to be inserted along shaft axis 10A into the slot 36. In order to angularly align the shaft and slot, an axis 10B of the slot 36 may align with shaft axis 10A. Referring to FIGS. 5 and 6, the slot 36 may have a suitable shape, such as a bore 37 with cutouts 38 shaped to receive each pin 30.

Referring to FIGS. 5-8 and 18, the female socket 14 may have a shape suitable to catch the shaft 32. The female socket 14 may be structured to catch the radial latch pin 30 to prevent removal from the slot 36, after the shaft 32 is rotated about the shaft axis 10A out of alignment with the slot 36. The socket 14 may comprise a socket body 34 that defines an axial bore 44. The slot 36 may be defined axially through a plate 39 or other suitable structure that extends transversely across the bore 44. The plate 39 may define an upper surface 34A of the socket body 34, which faces the male quick connector 12 when the connector system 10 is engaged. The shaft 32 and pins 30 may be sized and structured relative to the plate 39 such that the male connector 12 has an inserted position where the shaft 32 and pins 30 extend past an undersurface 39A of the plate 39. Thus, upon rotation of the shaft 32 after insertion, the pins 30 move out of alignment with pin channels or cutouts 38. If the user then attempts to pull the connector 12 out, the pins 30 will contact undersurface 39A and removal will be prevented.

Referring to FIGS. 5-8 and 18, the female socket 14 may have a shape suitable to stop the shaft 32 from exiting the socket 14 via the slot 36. A stop may function in a variety of ways. For example, in a bayonet mount system, the pins ride up a radial ramp into a serif, which the pin may be biased into to prevent accidental exiting of the pin from the serif (not shown). In the example shown, the undersurface 39A of the plate 39 may define a stop 42 for the radial latch pin 30. For example, the undersurface 39A may define an arcuate channel 40 whose radial ends define the stop 42. The stop 42 may restrict movement of the pin in the direction of the stop 42. Thus, once the pins are inserted through the cutouts 38 into bore 44, the shaft 32 rotated, and the shaft retracted partially to bring the pins 30 into contact with the channel 40, further rotation of the shaft 32 will prohibit pins 30 from aligning with cutouts 38 due to the location of stops 42. As addressed below, a biasing device may be used to bias the pins 30 into the channel 40.

Figure 42:
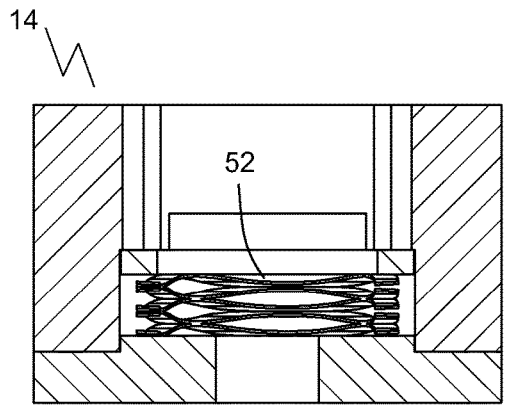
FIG. 42 is a section view taken along the 42-42 section lines from FIG. 41.
Figure 43:
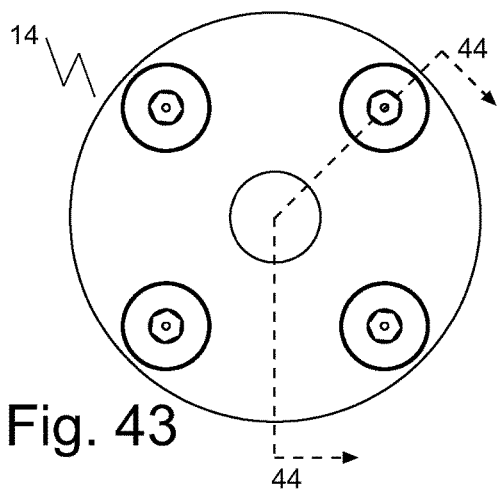
FIG. 43 is a bottom plan view of the female socket of the connector system of FIG. 39.
Figure 44:
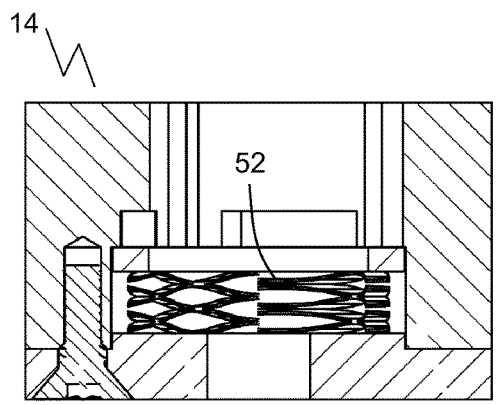
FIG. 44 is a section view taken along the 44-44 section lines from FIG. 43.

Referring to FIGS. 2, 18, and 20-21, the female socket 14 may comprise a biasing device 52 that biases the radial latch pin 30 into engagement with the stop 42 or undersurface 39A. For example, the biasing device 52, such as a spring as shown, may apply a force, for example directly or indirectly through a washer 46, against the pins 30 towards the undersurface of the plate 39, such that the radial latch pin 30 abuts the undersurface of the plate 39 unless a sufficient opposing force is applied by the user 50 to depress the biasing device 52. Thus, the male quick connector 12 may be structured to quick release upon depressing the male quick connector 12 further into the slot 36 against the biasing force of the biasing device 52, and rotating the shaft 32 such that the radial latch pin 30 aligns with the slot 36. The undersurface of the plate 39 may define a washer or spring seat 48 on which the washer 46 or biasing device 52 rests when the connection system 10 is in a locked position. Referring to FIGS. 42 and 44, other suitable biasing devices 52 may be used such as a wave disc spring.

Figure 2:
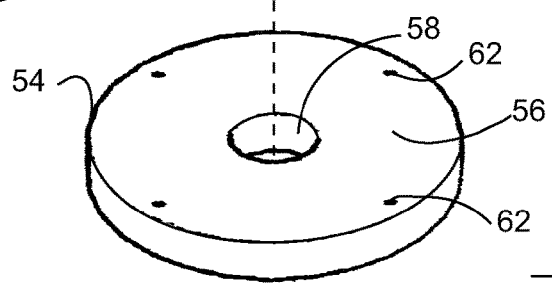
FIG. 2 is an exploded perspective view of the connector system of FIG. 1.
Figure 3:
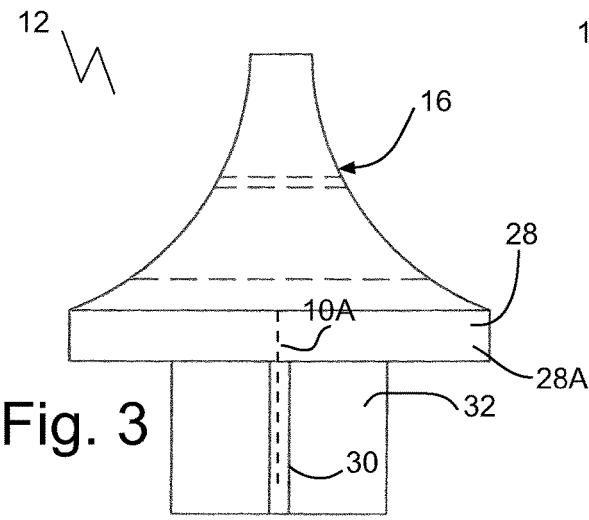
FIG. 3 is a side elevation view of the male quick connector of the connector system of FIG. 1.
Figure 4:
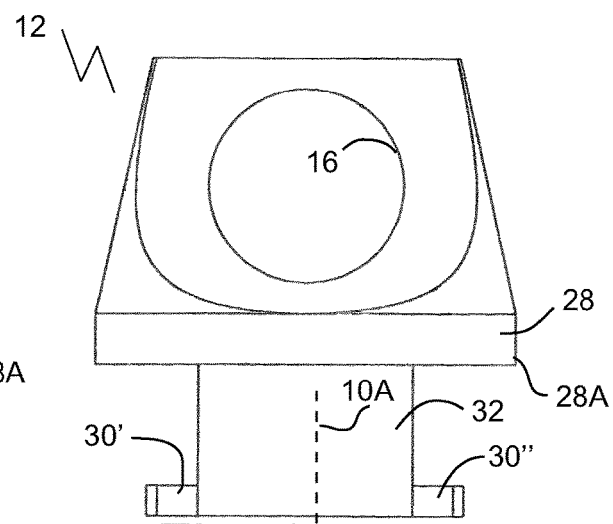
FIG. 4 is a front elevation view of the male quick connector of the connector system of FIG. 1.

Referring to FIGS. 2, 18, and 20-21, the socket 14 may be mounted to the substrate 21 via a suitable fashion and mechanism. The socket 14 may have a suitable mechanism for securing to the substrate 21. A base of each female socket 14 may be defined by a base plate 54 that is secured to the socket body 34. Referring to FIG. 21, the base plate 54 may be secured to the socket body 34 by a fastener, such as a lag bolt 60. The base plate 54 may define a fastener bore 58. The fastener bore 58 may be defined axially through the base plate 54, for example coaxial with axis 10A, and through which passes a fastener such as bolt 60 that anchors the base plate 54 to the substrate 21. Referring to FIGS. 2 and 21, the base plate 54 may be secured to the socket body 34 by a suitable mechanism, such as by passing fasteners 62 through aligned apertures 66 and 64 in the plate 54 and socket body 34, respectively. A top surface 54A of the plate 54 may abut an undersurface 34B of the body 34. The top surface 54A may define a spring seat 56 upon which the spring 52 sits.

Referring to FIG. 21, the socket 14 may be anchored to the substrate via a suitable mechanism. In the example shown, the socket 14 is embedded within the substrate 21', which may be a drywall board if the substrate is a wall, or may be a tile or carpet or rubber surface if the substrate is a floor, as examples only. In some cases the socket 14 is mounted directly to a stud 21" or other structural frame member of a building. In other cases the socket 14 is mounted on the substrate 21, or partially but not fully embedded in the substrate 21. In the example shown, outer surface of the socket 14 and substrate 21 are flush with one another.

Referring to FIGS. 1-4, the male quick connector 12 may have a suitable structure. The shaft 32 may depend from a knob 28. A base flange 28A of the knob 28 may be shaped to abut socket body 34, and in some cases may be shaped such that when in abutting relationship the cylindrical sidewalls of flange 28A and body 34 are flush with one another.

Figure 1:
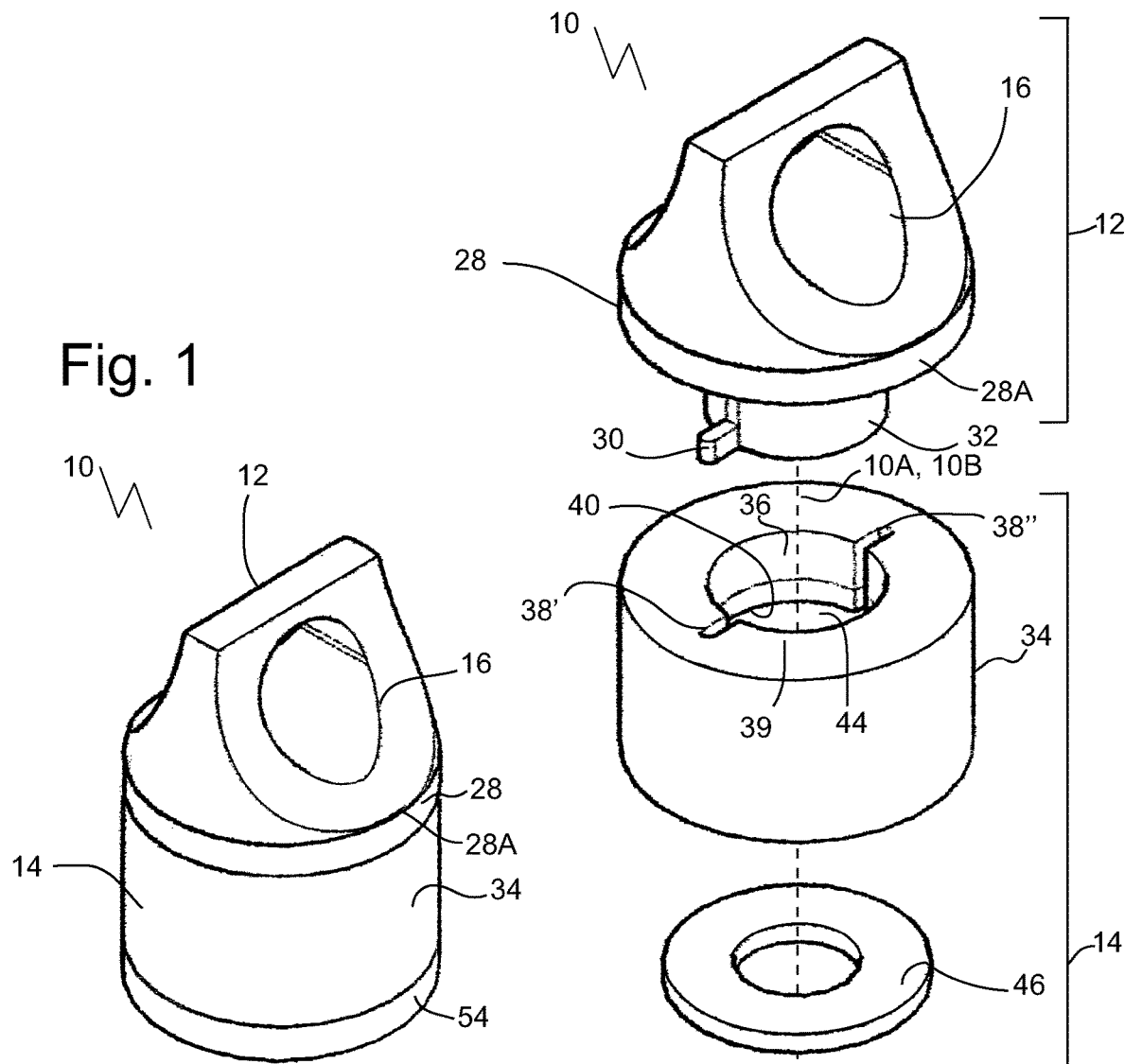
FIG. 1 is a perspective view of a connector system in a locked position.

Referring to FIGS. 1-4, 9-10, and 20-21, the male quick connector 12 may receive the strap 18 via a suitable fashion. One example is to use a strap aperture 16. Referring to FIGS. 1 and 2, the aperture 16 may be defined through the knob 28 in a suitable fashion. Referring to FIGS. 9 and 10, a different embodiment of connector 12 is illustrated, and that incorporates, among other things, a two part strap connector system. The strap aperture 16 may be defined between a first part 12A and a second part 12B. The first part 12A and the second part 12B may be secured together in a closed position by a suitable mechanism, such as using fasteners (shown), latches, or hinges. Referring to FIG. 20, for example, the first part 12A and second part 12B may be secured by fasteners 94 passed through aligned apertures 90 and 92 in the second part 12B and first part 12A, respectively. The fastener 94 may engage by press fitting, snap fitting, or may be formed as an integral fastener, threaded fastener, or rivet. Other mechanisms may be used, such as latches, to secure the parts. Referring to FIGS. 9-13, in the example shown the second part 12B includes a plate 88 from which shaft 32 depends. Plate 88 forms a substrate upon which columns 91 rest to support a base 80 of a knob 28 spaced over but not contacting plate 88, to defined a slot for the strap (not shown) to pass through. Knob 28 may include an upstanding handle portion 86 with a top flange 84, or other suitable structure as may be functionally or ergonomically used.

Resistance training (also called strength training or weight training) is the use of resistance to muscular contraction to improve the strength, anaerobic endurance, tone, length, flexibility, proper function, and size of skeletal muscles. During a resistance training workout, a person may move their body or limbs against resistance provided by their body weight, gravity, bands, weighted bars or dumbbells. In some cases, a person may use a machine specifically designed to provide resistance training to target a particular muscle or group of muscles. The benefits of resistance training are considered to be significant. People who participate in this form of training typically have an easier time moving through activities of daily living because their muscles move more efficiently. Furthermore, resistance training has been shown to strengthen bones, improve cardiac health, raise metabolic rate, and increase lean muscle mass.

Resistance band training is a popular form of resistance training Resistance bands are made of an elastomeric material. In some cases such a material is a strong, thin rubber. The band or strap may include a handle at an end, and may come in a variety of resistances and dimensions. Unlike weights, resistance bands do not rely on gravity to provide resistance and therefore may place less pressure on the user's joints than do gravity resistance training methods. Resistance bands may also be particularly advantageous for injury rehabilitation, enabling a user to improve flexibility by increasing range of motion by repetitive motions of moving the band away or towards the body. Resistance bands are also lightweight and portable and are typically available at significantly lower costs than other forms of resistance training equipment and apparatuses.

Many resistance band training exercises require at least one part of the band (for example a non-handle end) to be mounted to a fixed structure. For example, a resistance band may be required to be anchored to a doorway or incorporated into an exercise machine. Track systems may be mounted on a support such as a wall to fix part of a resistance band to a slidable hook, or to a series of hooks.

Referring to FIGS. 14-17, the connection system 10 may be used as a resistance strap exercise system. The strap 18 of the interchangeable connection system 10 may be elastic for such a purpose, although inelastic straps may be used for some exercises, such as if the male connector 12 were mounted to a socket 14 on the ceiling and the strap 18 were to be used to climb to the ceiling. With an elastic strap 18, a tensile force applied to the band/strap 18 by a user will elongate the strap 18 from its unstretched, neutral length, and similarly, the strap 18 may return to the unstretched length when the tensile force is released. Elasticity differs from flexibility, which refers to the ability of the strap 18 to bend under non-tensile loads. A user 50 may mount an elastic strap 18 to substrate 21 by connecting the male quick connector 12 to a fixed female socket 14. The elastic strap 18 may have a suitable shape, such as tubing-shaped (more suitable for the embodiment of FIG. 1), or planar-or-ribbon-shaped, for example a latex band (more suitable for the embodiment of FIG. 9).

Referring to FIGS. 14-17, the strap 18 may connect to a handle or foot grip 20. In some cases, the grip 20 is selected from a plurality of interchangeable grips, such as clevis shackle-shaped handles (FIGS. 14-16), and dual-hand bar handles (FIGS. 17 and 17A), to name a few options. From a position where the strap 18 is taut but unstretched, a user 50 may engage in resistance training by applying a force on the handle grip 20 such that the strap 18 is lengthened into a stretched position. The user 50 may then gradually release the force applied to the handle grip 20 until the strap 18 returns to an unstretched length. An interchangeable connection system 10 may also include a plurality of male quick connectors 12 with corresponding straps 18. A male quick connector 12 may secure to more than one strap 18 such that more than one user 50 may use a connection system 10 at the same time. Male connectors 12 and handles or grips 20 may secure to opposing axial ends of the strap 18, or at intermediate locations along the length of strap 18.

Referring to FIGS. 17B, and 28-31, a strap connection system 10 may comprise a weight bar collar 100, which could also be referred to as a weight bar ring. As shown in FIG. 17B, weight bar collar 100 may be connected to the elastomeric strap 18 of a resistance exercise strap system. In other cases, the collar 100 may be connected to a non-elastomeric strap. Referring to FIGS. 28-31 bar collar 100 may comprise a spool 104 configured to permit a strap 18 (FIG. 17B) to be wound around bar collar 100, for example at least partially wound around the collar 100, and in some cases wrapped around collar 100 one or more times. Spool 104 may include a sleeve 105 and opposed end flanges 108. Flanges 108 may extend radially outward from the spool 104 at the ends of the spool 104. In some cases flanges 108 are not provided or one is provided.

Referring to FIGS. 28-31, a locking part may be provided to secure the strap 18 to the collar 100. The locking part, such as one or more bars or plates 102, may extend between the opposed end flanges 108. The locking part may be spaced over an external cylindrical surface 109 of the sleeve to secure in use a strap 18 in between the locking part, the external surface, and the opposed end flanges 108. Plates 102 may be secured to the flanges 108 or another part of collar 100, for example via fasteners 111, to form a bridge or cantilever that spans the spool 104 and retains the strap 18 against the spool 104. In some cases the locking part may be releasable, for example via a latch, magnet, or other quick-release connector, to permit the strap 18 to be conveniently secured and released to the collar 100 as desired. Referring to FIG. 17B, strap 18 may be wound under the plates 102 to secure the strap 18 to the bar collar 100.

Figure 17:
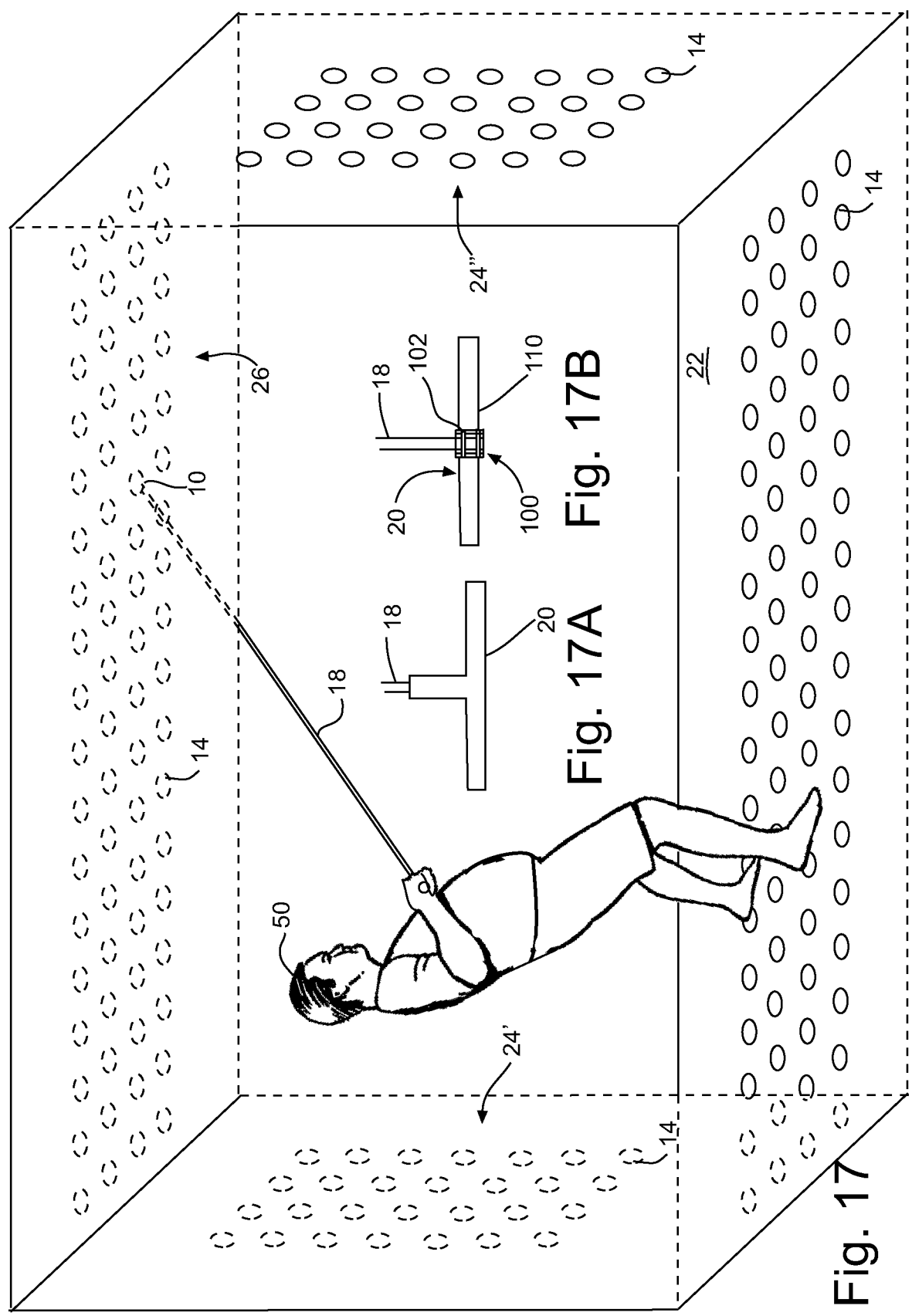
FIG. 17 is a perspective view of a person in a room using the connector system of FIG. 1 to connect a resistance band to a ceiling to carry out a variant of a row exercise or a pull-down exercise.
Figure 18:
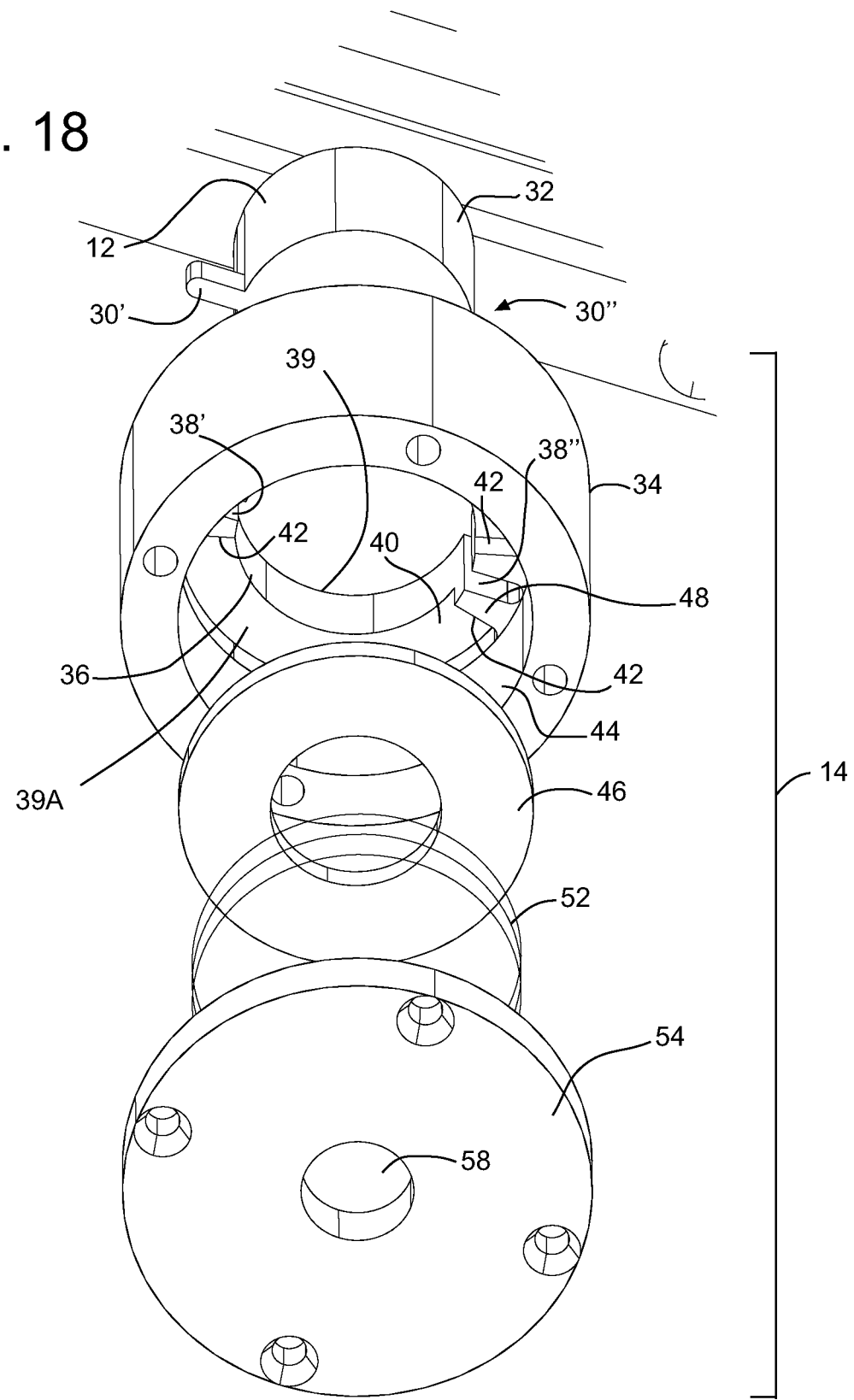
FIG. 18 is an exploded perspective view of the connector system of FIG. 9, illustrating the arcuate channel in the undersurface of the female socket.

Referring to FIGS. 28-31, the collar 100 may have other suitable characteristics. Collar 100 may include an internal bushing sleeve 106 that may be secured to the interior of the spool 104. An interior cylindrical wall 107 of the bushing sleeve 106 (or another part of the collar 100), may be structured to receive a weight bar (shown in FIG. 17B as bar 110). A weight bar is a rigid bar or frame structured to mount one or more weights, such as weight plates, by inserting the bar through a central aperture in the plate, and sliding the plate into position on the bar. The weight bar may be made of a suitable material such as steel or another metal. In some cases the embodiments here may obviate the need for weight plates, thus greatly reducing the cost of the system. The weight bar may form cylindrical rod, which may have an outer diameter of suitable dimensions, such as between 25 and 50 millimeters, although larger or smaller diameters may be used. The inner dimensions of the sleeve 106 or collar 100 may be sized to fit the bar, for example by having a corresponding internal diameter slightly larger than the outer diameter of the bar. The collar 100 may be structured to secure or retain the bar within the collar 100. For example, the collar 100 may be made of a suitable material, such as rubber or textured material, that creates friction with the bar 110 to retain the bar within the collar 100 against removal under normal forces when the bar 110 is being used for exercise. The bar collar 100 may comprise a locking mechanism such as a clamp, spring, friction lock, or latching system, to secure the bar within the bar collar 100 during use. As shown in FIG. 17B, bar 110 may be inserted into bar collar 100 to form a handle grip 20 to permit the user to perform a variety of exercises with the bar, with or without additional weight plates mounted on the bar and secured by collar 100. Referring to FIGS. 17 and 17B, the strap 18 may be connected to a first connector such as a male quick connector 12 (for example at the opposite end of the strap 18 as collar 100), to permit the strap 18 to be connected to any of a plurality of second connectors, such as female sockets 14, anchored to a substrate.

Figure 15:
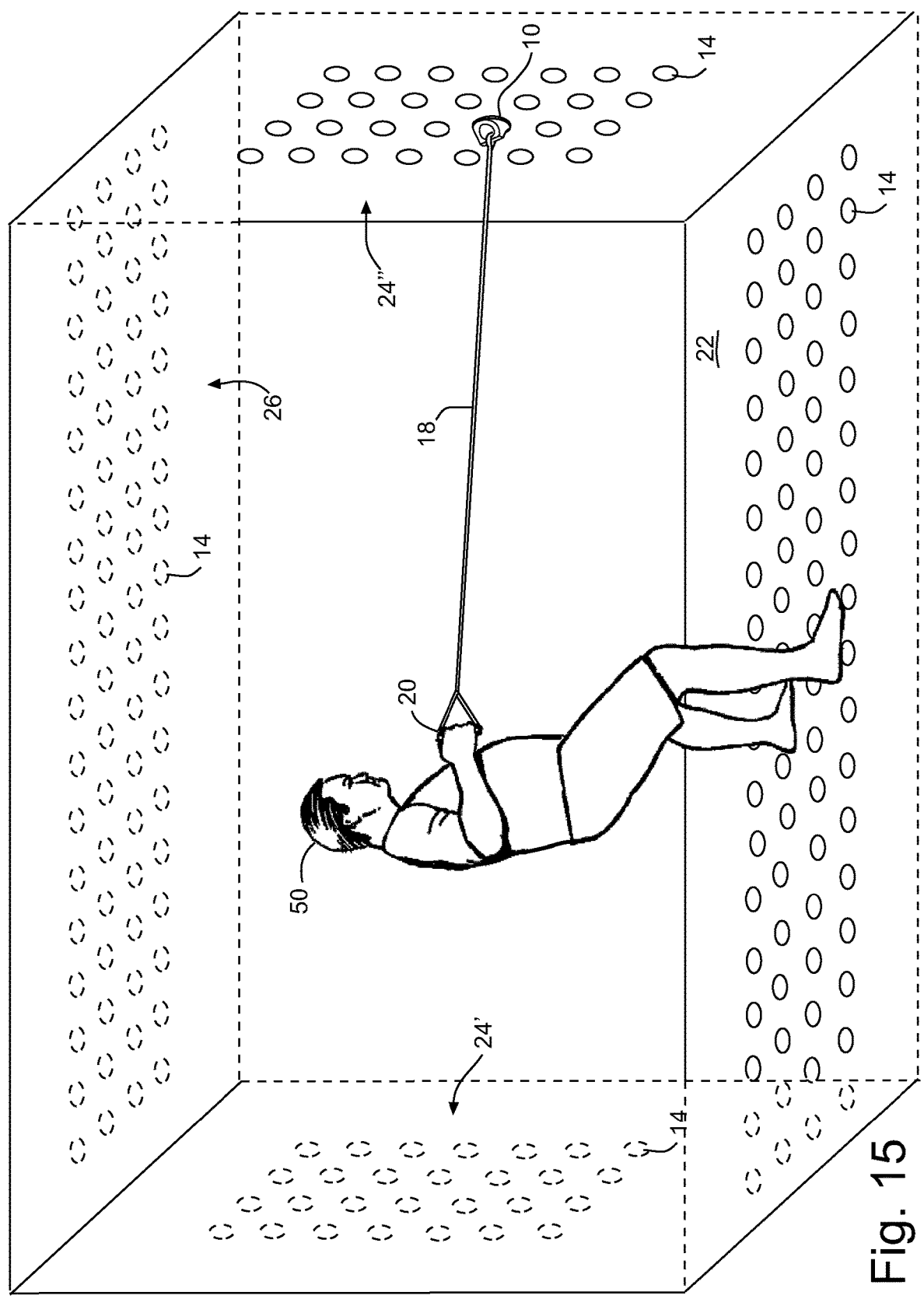
FIG. 15 is a perspective view of a person in a room using the connector system of FIG. 1 to connect a resistance band to a side wall to carry out a row exercise.
Figure 16:
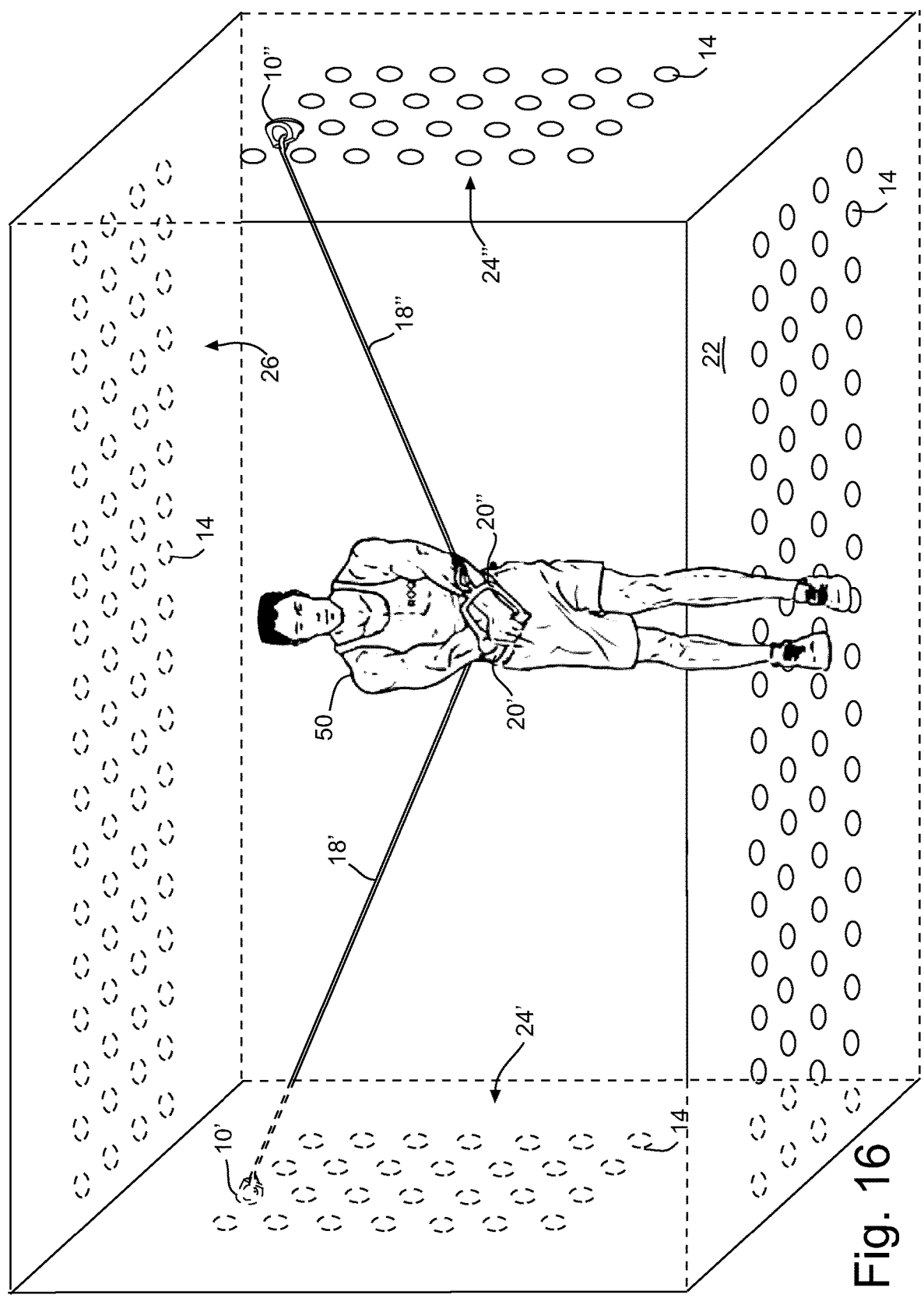
FIG. 16 is a perspective view of a person in a room using the connector system of FIG. 1 to connect resistance bands to opposing side walls to carry out a fly exercise.

Referring to FIGS. 14-17 different exercises are shown. In FIG. 14, a squat exercise is simulated using a pair of connectors and straps 18 secured to the floor 22. In FIG. 15, a row exercise is simulated by mounting a singled connector 12 to the wall 24. In FIG. 16 a fly exercise is simulated by mounting two straps 18 and connectors 12 to opposing walls 24. Referring to FIG. 17 a pull-down exercise is simulated by mounting the strap 18 and connector 12 to a ceiling 26. In other cases, exercises with an inelastic strap may be used (not shown). For example, two inelastic straps 18 may be mounted to a ceiling 26 such that a user 50 may suspend themselves from the ceiling 26, for example to engage in suspended core exercises or to perform a pull-up. Ring handles (not shown) may be used to connect to straps 18 for such a purpose.

Referring to FIGS. 14-17, different exercises may be achieved by varying the location of the male-female connection, the number of straps, and the type of handles. The substrate 21 where the sockets 14 are located may be one or more of a floor 22 (FIG. 14), wall 24, or a ceiling 26 of a room, or two or all of these types. The plurality of female sockets 14 may comprise female sockets 14 on the wall 24 and floor 22, or may comprise female sockets 14 on the wall 24, floor 22, and ceiling 26 of a room. The female sockets 14 may be distributed in a suitable pattern or arrangement on the substrate 21, for example arranged in series in a matrix as shown to create a particular application of the interchangeable connection system. A matrix may consist of a series of regularly spaced columns and rows. A matrix pattern may allow a user 50 to readily change the position of a connection system 10 or several connection systems 10 to suit the band requirements of a particular exercise. The plurality of female sockets 14 may also be distributed such that more than one user 50 may be able to use the interchangeable connection system 10 at the same time or engage in partner exercises.

Referring to FIG. 19 each strap 18 may connect to two or more male quick connectors 12. A strap 18 may extend between the pair of male connectors 12. For example, a strap 18 may not have a user 50 end but rather be fixed to a connector system 10 at both ends of the strap 18. A plurality of female sockets 14 may be provided to quick connect and quick release from each male quick connector 12 in the pair. The interchangeable connection system 10 may thus comprise a plurality of male quick connectors 12 and straps 18. A strap 18 may diverge into several straps 18, each of which may have a male connector 12, such as with a v-shaped diverging strap 18.

Figure 48:
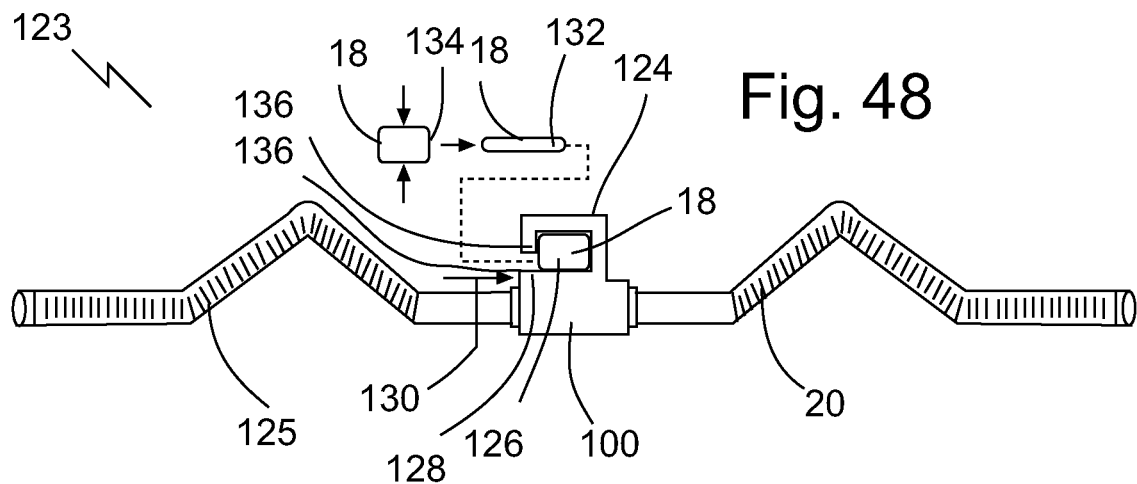
FIGS. 48-50 are side elevation views of resistance strap exercise systems each having a hook and a collar mounted on a curl bar (FIG. 48), a straight bar (FIG. 49), or a hand grip (FIG. 50).
Figure 49:
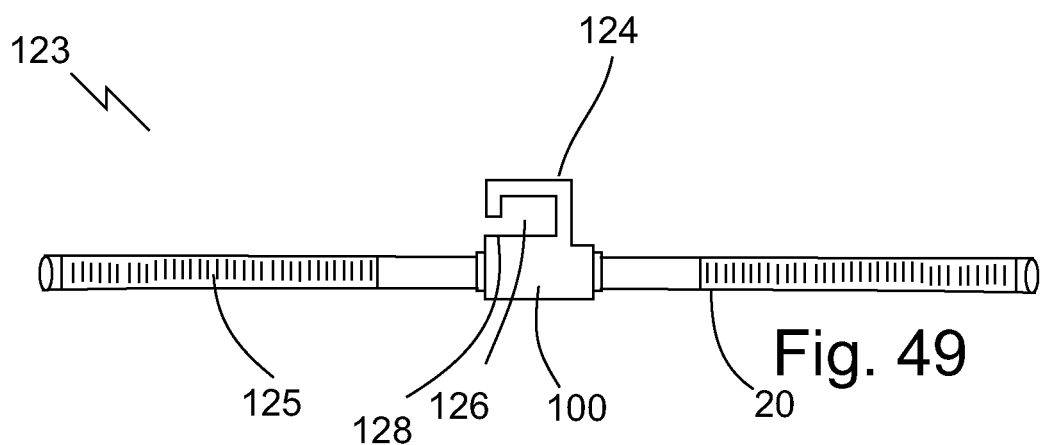
Figure 50:
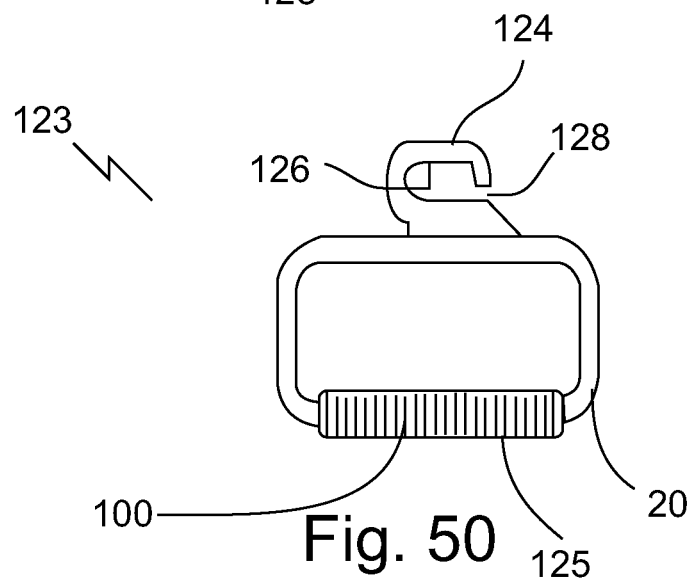

Referring to FIGS. 48-50, a further embodiment of a resistance strap exercise system 123 is illustrated. The system 123 may combine a hook 124 with a handle such as handle grip 20. An elastomeric strap 18 may be part of the system 123. The hook 124 may be connected to the handle grip 20, by a suitable method such as welding (shown), fasteners, adhesive, or other methods. The hook 124 may define a strap passage 126. The passage 126 may have a mouth to receive the strap 18, for example strap insertion slot 128. Referring to FIG. 48, slot 128 may be sized to pass the strap 18 only when the strap 18 is sufficiently squished or compressed. For example, the slot 128 may be sized to receive and release the elastomeric strap 18 in a direction 130 transverse the elastomeric strap 18 (i.e. transverse the axis of the strap 18) when the elastomeric strap 18 is in an elongated configuration 132 under tension. When under tension, the strap 18 may reduce in cross-sectional dimensions sufficient to permit entry of the strap 18 laterally into the slot 128. The slot 128 may be sized to block the elastomeric strap 18 when the elastomeric strap 18 is in a neutral configuration 134. The opening (slot 128) may thus be smaller than the thickness of the band or strap 18, for example by up to or more than an ⅛ of an inch, meaning that to get the band either in or out of the system you need to stretch the band till the thickness has thinned out to the point it can fit in through the hook. The hook 124 may comprise one or more rigid pincer jaws 136 in spaced and fixed configuration to define the strap insertion slot 128. The slot 128 opens up into passage 126, which may be larger in cross-section than the slot 128 to permit axial movement of the strap 18 when not under tension (i.e. when neutrally configured). The hook 124 may mount to the bar or handle grip 20 via a collar 100 around the bar or handle, for example a collar mounted to rotate or swivel about the bar. The system 10 may incorporate any of the other features of the connection systems or other embodiments of this disclosure, including the use of quick connectors on the other end of the strap 18 (not shown). To release the strap 18 from the passage 126, a user may apply tension or otherwise squish the strap 18 to reduce the cross sectional diameter sufficient to pass the elastomeric strap 18 out of the strap passage 126 via the strap insertion slot 128. The handles in this document may be structured to improve grip, for example textured with texturing 125, or using other suitable mechanisms.

Referring to FIGS. 51-60, the interchangeable strap connection system 10 may incorporate an exercise rack 138. Referring to FIG. 51, in the example shown the substrate 21 comprises an exercise rack 138. The exercise rack 138 may be formed of beams 140 and columns 142. The beams and columns may form a suitable structure, such as a rectangular squat and/or bench press rack. The beams may function as cross members or cantilevers. The columns may be oriented as uprights. In the example shown the beams and columns may form a cage 144 defining an exercise zone 146. Parts may connect in a suitable fashion, such as by using pins 149 with snap rings (not shown) for locking. Referring to FIG. 51A, an example of a pin 149 connection is shown, comprising a threaded bolt 149B that inserts into a corresponding threaded aperture in a sleeve 149A. Corresponding flanges 149A-1 and 149B-1 on the sleeve 149A and bolt 149B, respectively, along with body 149A-2 of sleeve 149A, may cooperate to form a spool that secures the parts therewithin together.

Referring to FIG. 51, the cage may have a suitable configuration. The cage 144 may at least partially surround the user in use, for example above, below, to the sides, and in front of the user in the example shown. The cage 144 may comprise a three dimensional arrangement of beams and columns each extending along at least two axes of coordinates, for example beams may run along the X and Y axes, while columns may extend in the Y and Z axes. Referring to FIGS. 51 and 59-60, a set 141 of at least three beams, such as beams 140 may be mounted to a first column 142A and arranged in a C-shape to define the exercise zone 146—this is one example of a C-shaped beam (a beam or beams that has/have a C-shaped part or overall form). The beams 140B may form arms linked by a cross member to surround the user when located in the exercise zone 146. Referring to FIGS. 51 and FIGS. 57-58, the first column 142A may mount an overhead beam 140A above both the exercise zone 146 and the set 141 of at least three beams. The columns 142A and in some cases beams 140 may be structured to incorporate sockets 152 for receiving weight bar supports such as J-hooks, for example to provide resting surfaces for weight bars in use.

Referring to FIG. 51, the plurality of female sockets 14 may be spaced on the beams and columns of the cage. For example, the sockets 14 may be located on inside surfaces (surfaces facing the exercise zone 146) of each beam and column, or one or more of them. In addition, the front faces 147 of each column 142 may incorporate sockets 14. The system shown may form a multi-rack. The rack 138 may comprise a platform 148.

Referring to FIG. 51, the rack 138 may be configured for, for example interchangeable between suitable configurations for, one or more of disabled and abled bodied individuals. The example shown is suitable for paraplegic athletes, to permit such individuals to connect the straps and connectors disclosed herein to perform simple rehabilitation for everyone from an athlete to a senior. The set 141 of beams forms a halo, with the column 142A forming a tower at the back attached to the base platform 148. A ramp (not shown) may be provided to improve accessibility, but in general the rack 138 may be accessible for a wheelchair or a gym bench. The rack 138 may incorporate suitable features such as a solid and stationary model, and a model that is designed to fold up and slide away when not in use. The rack 138 may provide full access to squat and bench press exercises, and other diverse exercises not possible or not possible with such simplicity as possible with a standard squat cage having four pillars.

Figure 61:
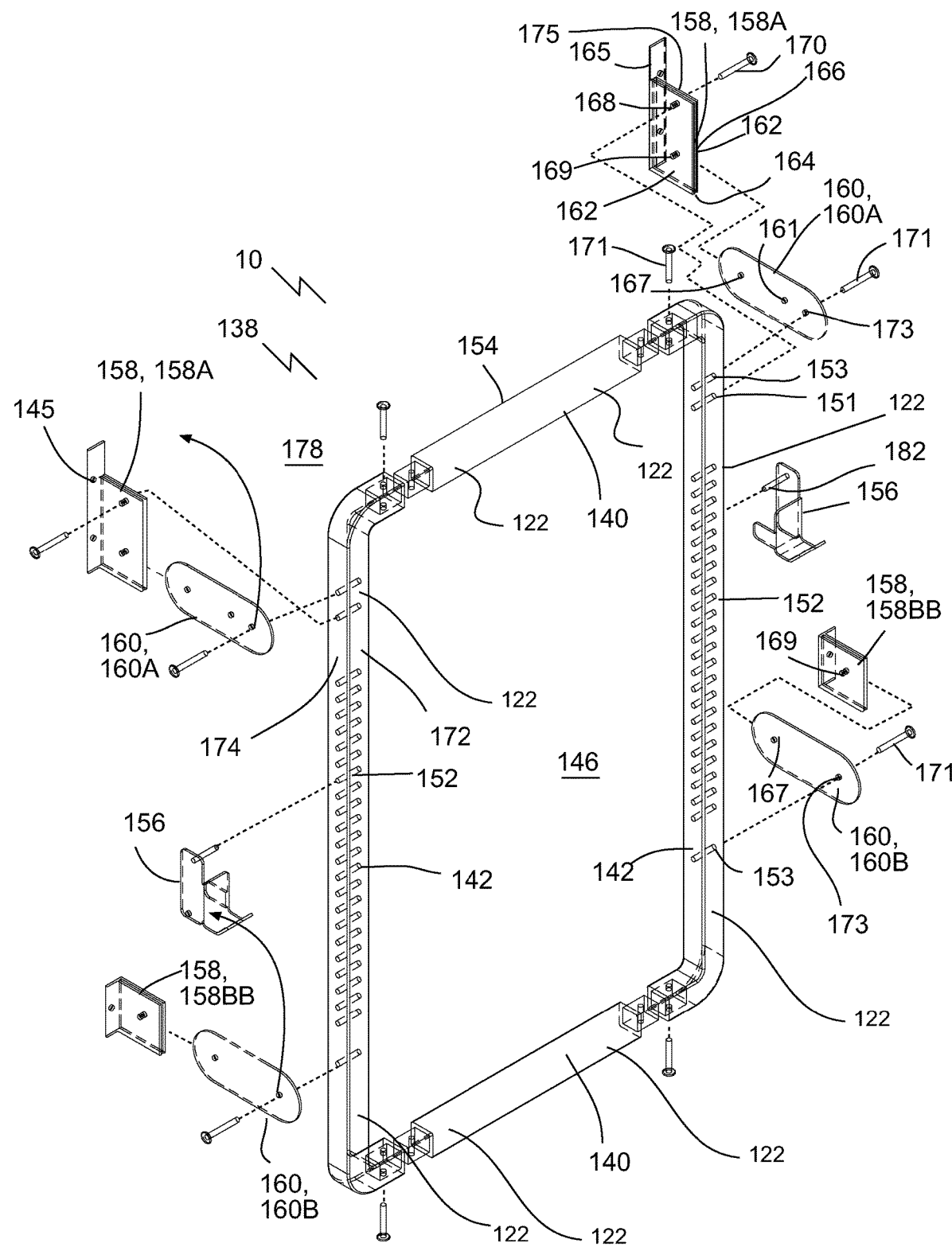
FIG. 61 is an exploded perspective view of a foldable exercise rack system, with internal weight bar support sockets shown in dashed lines.

Referring to FIGS. 61-72 and 80-83, an exercise rack 138 system is shown in whole and in part. Referring to FIG. 61, the rack 138 may have a structural frame 154 formed by columns 142 and beams 140. The frame 154 may have a suitable shape such as a rectangular shape. The columns, beams, or both the columns and beams may have a series of sockets, such as sockets 152 structured to receive weight bar supports 156, or sockets 14 (not shown) for example at points 122, to receive strap connectors 12 (not shown). The columns and beams may secure together via a suitable mechanism such as pins 171 through aligned apertures, locked in place. Rack 138 may comprise one or more wall mounting brackets 158, and one or more swing arms 160. Each swing arm 160 may be pivotally mounted between a respective wall mounting bracket 158 and the structural frame 154. The swing arms 160 may be configured to fold the structural frame 154 up and down relative to the wall mounting brackets 158 to move the structural frame 154 between a deployed, laterally extended configuration, and a stowed, laterally retracted position (for example where the frame 154 is raised and laterally retracted toward and in some cases against the wall as shown).

Referring to FIGS. 61-69 and 80-83, the wall mounting brackets 158 and swing arms 160 may have a suitable configuration. In the drawings, two types of brackets 158 and swing arms 160 are shown, upper brackets 158A and corresponding arms 160A, and lower brackets 158B and corresponding arms 160B, referring to the location on the frame 154 where such parts affix. The swing arms 160 may comprise plates as shown, and in some cases the swing arms move in a plane defined by the respective plate. The wall mounting brackets 158 may have side walls 162 and a base shelf 164 defining a swing arm receiving channel 166. In the example shown, a wall end of the swing arms 160 insert into the channel 166, until apertures 167 and 169 align, and a pivot pin (not shown) can be passed through to permit arm 160 to pivot relative to bracket 158. Arm 160 mounts pivotally to columns 142 via alignment of apertures 173 and 153 in arm 160 and column 142, respectively, so that a pin 171 may be inserted and secured. All pins in this document may have suitable securing mechanisms such as snap rings, cotter pins, latches and others. When viewed from the side, each pair of upper and lower arms 160A, 160B may form a closed mechanical linkage, such as a four bar linkage, that can fold up and down to stow and deploy the system as desired. A rear wall 165 of each bracket 158 may secure, for example via fasteners (not shown) passed through apertures 145 in rear wall 165 into a wall 178, or by another suitable mechanism such as adhesive, may be used to mount the system to a wall 178. The system may form a wall mounted or suspended type of squat or benchpress rack, with its own style of mounting brackets that are designed to simply have a pin pulled to permit the entire halo to slide up and against the wall when not in use. Alternatively, the rack 138 may be removed from brackets and slid under a bed or placed in another suitable storage location.

Referring to FIGS. 61-69 and 80-83 the brackets 158 may incorporate a suitable locking system, for example to lock the system in one or more of the stowed and deployed positions. In the example shown the system is structured to rest by gravity in place in the deployed position, with arms 160 resting on shelves 164. However, when folded up in the stowed position, upper brackets 158A and corresponding arms 160A may incorporate a lock. The side walls 162 of one or more mounting brackets 158A and their respective swing arms 160A may have apertures 168 and 161, respectively, that align when the exercise rack 138 is in the stowed, laterally retracted position to receive a locking pin 170. Pin 170 may also pass into an aperture 153 in the frame 154 as shown. A snap ring (not shown) or other lock may assist in securing the system in place. A top end 175 of each bracket 158A may be sized to permit arm 160A and aperture 173 swing over end 175 unobstructed for full movement. Lower brackets 158B and arms 160B lack such features, although it should be understood that any of the bracket/arm combinations shown may have or not have a suitable lock.

Referring to FIG. 61, the rack 138 system shown may incorporate the connection system disclosed herein. Points 122 are shown as examples of where first connectors, such as female sockets 14 (shown elsewhere) may be located, to connect to a strap 18 to permit the first connector to interchangeably quick connect with and quick release from the second connectors. The locations or points 122 of the sockets 14 may be arrayed at different locations, such as adjacent each corner on the respective column and beam of that corner, about the frame 154 for flexibility in use.

Referring to FIGS. 61 and 74-79, the system may incorporate a suitable mechanism for mounting a weight bar support 156. In the example shown, the series of sockets may comprise third connectors, i.e. sockets 152, which are structured to receive weight bar supports 156. The second and third connectors may be distinct from one another (for example to mount incompatible supports or connectors 12) in one or more of shape and size. Sockets 152 are shown arrayed in series on side faces 174 of the columns 142, as opposed to front faces 172 that face outward. This is in contrast to a typical squat rack that has forward (front) facing weight bar support apertures only. By placing the sockets 152 in the side faces 174, surface area on the front faces 172 is cleared up for locating sockets 14 for use in the quick connection system.

Referring to FIGS. 61 and 74-79, a suitable weight bar support 156 may be used. Referring to FIGS. 74-79, weight bar support 156 may have a J-hook 176 defining a weight bar support on a front face 189 of the J-hook 176. A support arm 180 may be extended from a rear face 188 of the J-hook 176. An exercise rack engaging pin 182 may be extended in a lateral direction 184 (FIG. 74) from the support arm 180, for example normal to the support arm 180 and parallel to a weight bar axis 192 defined by J hook 176. The support arm 180 may be a first support arm, and a second support arm 186 may be extended from the rear face 188 of the J-hook 176. The first support arm, the second support arm, and the rear face of the J-hook may define a rack column receiving channel 190, to at least partially surround the cross sectional profile of the column 142 for stability. The various parts may be formed by suitable mechanisms, such as the J-hook 176 and support arms may be formed of plates. The exercise rack engaging pin 182 may be mounted such that, when the weight bar support 156 is mounted to a vertical column 142 of an exercise rack 138, the exercise rack engaging pin 182 is vertically higher than the weight bar support as shown. In use, the user may select an appropriate location to mount the support 156, and the user may then connect the weight bar support 156 to the column of the exercise rack 138.

Embodiments of the racks 138, weight bars, handles, connection systems, and substrates may be made by suitable materials. For example, metals, such as steel or aluminum, may be used. In some cases a polymer may be used, for example a relatively lightweight and sufficiently strong polymer to support the forces exerted upon an exercise cage, rack, or weight bar in use. In one case a polyamide may be used, for example R533 polyamide (also known as nylon 66). Nylon 66 (nylon 6-6, nylon 6/6 or nylon 6,6) is a type of polyamide or nylon. Nylon 66 may be made of two monomers each containing 6 carbon atoms, hexamethylenediamine and adipic acid, which give nylon 66 its name. Electrafil™, R533™, and Vydyne™ are all brand names used to marked such materials. Parts may be created by suitable processes such as using a mold, for example an injection mold. In some cases, the parts produced may have minimal polymeric stretch/deformation and may withstand up to and in some cases more than 1800 pounds of pull that current aluminum versions withstand, although lower ranges may be used, such as a product that is durable under a constant pull of 1000-1500 pounds. In one case the polymeric material part is less than 50%, for example less than 33%, of the weight of the same size of part made from aluminum. In one case a 290 pound steel rack may be replaced with a 65-70 pound rack. A weight bar made with R533H PA66 may be 8-10 pounds, much lighter than the steel or aluminum equivalent. Other polymeric materials may be used, including polyurethanes. Polymeric materials may be reinforced with structural materials, such as carbon fiber or glass fiber fill embedded within the materials, for example co-injected during the injection molding process.

A sample process for making Nylon −6,6 is as follows. Nylon −6,6 may be synthesized by polycondensation of hexamethylenediamine and adipic acid. Equivalent amounts of hexamethylenediamine and adipic acid are combined with water in a reactor. This is crystallized to make nylon salt, an ammonium/carboxylate mixture. The nylon salt goes into a reaction vessel where polymerization process takes place either in batches or continuously. Removing water may drive the reaction toward polymerization through the formation of amide bonds from the acid and amine functions. Thus molten nylon 66 is formed. It can either be extruded and granulated at this point or directly spun into fibers by extrusion through a spinneret (a small metal plate with fine holes) and cooling to form filaments.

Mooring may refer to any permanent structure to which a water vessel may be secured. Examples include quays, wharfs, jetties, piers, anchor buoys, and mooring buoys. A ship may be secured to a mooring to forestall free movement of the ship on the water. An anchor mooring fixes a vessel's position relative to a point on the bottom of a waterway without connecting the vessel to shore. As a verb, mooring refers to the act of attaching a vessel to a mooring. The most common way to secure a water vessel to a mooring is to use a rope that is looped around and knotted to a mooring.

Figure 22:
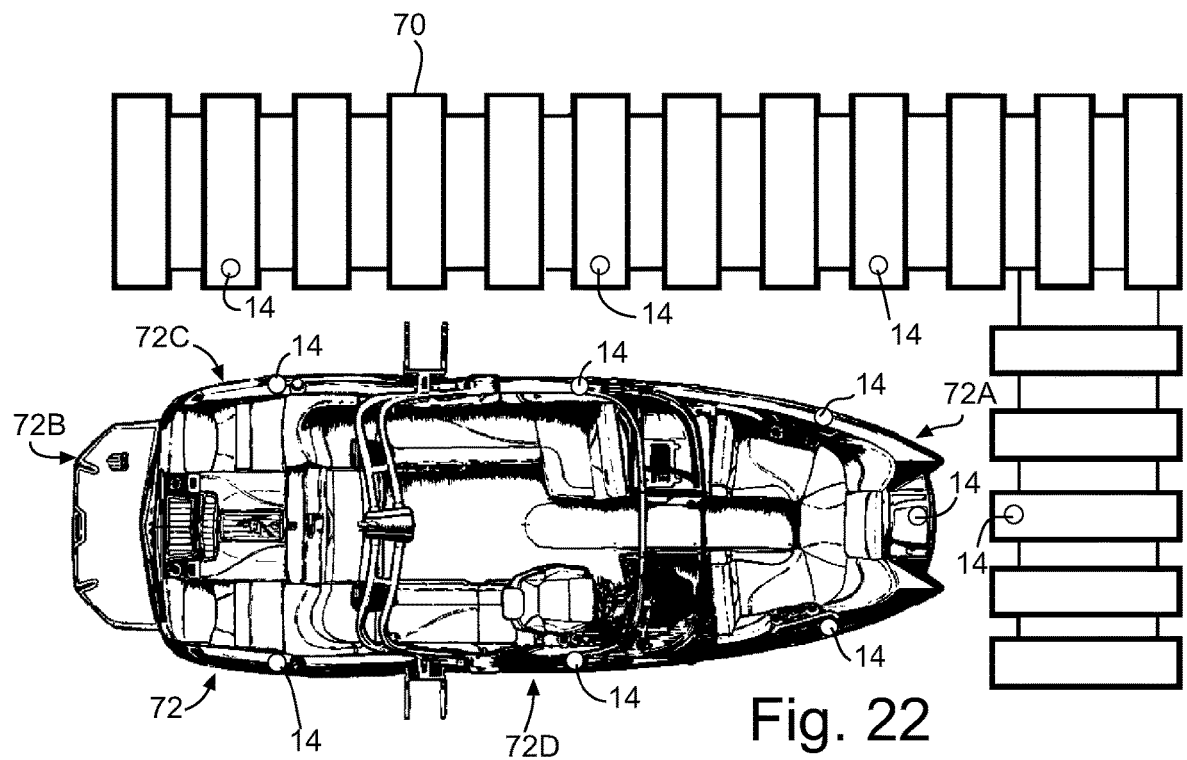
FIG. 22 is a top plan view of a boat mooring system, illustrating a boat with strap connection points at various locations on the boat and dock such that the boat may be connected by a tether extending between the boat and dock.

Referring to FIG. 22, the connection system 10 disclosed here may be used to anchor a boat to a substrate 21, such as a dock 70. The plurality of female sockets 14 may be mounted at different locations on one or more of a boat 72 and dock 70 adjacent the boat 72. For example, sockets 14 may be mounted at one or more of a front 72A, rear 72B, and sides 72C and 72D of the boat 72. If sockets 14 are provided on boat and dock, then a dual connector 12 strap 18 may be used such as shown in FIG. 19. A user wishing to dock a boat may secure the boat to the dock using the quick connector 12, and upon desiring to leave the dock, the user may either release one or both of the connectors 12 to break the anchor connection.

Figure 46:
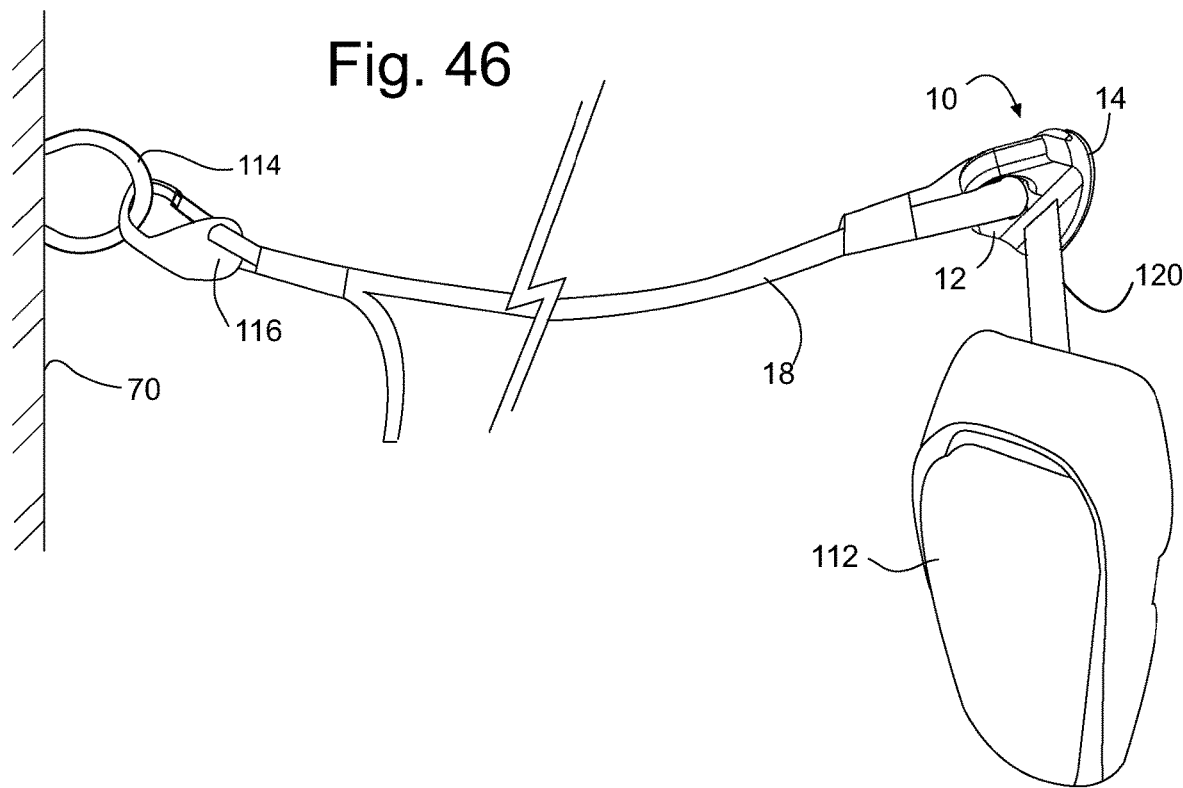
FIG. 46 is a perspective view of a connector system in a locked position to tether a boat to a dock, with a boat fender attached to the male quick connector.
Figure 47:
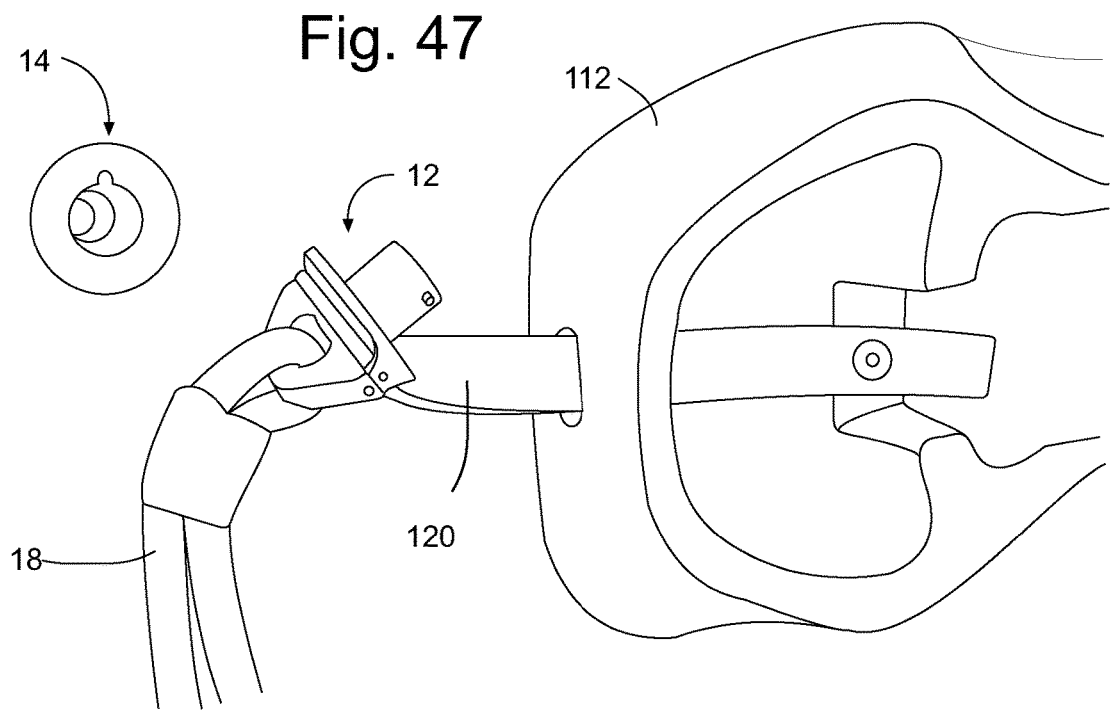
FIG. 47 is a perspective view of the connector system of FIG. 46 with the male connector detached from the female socket and the boat fender partially disassembled.

Referring to FIGS. 46-47, a boat fender 112 may be attached to the connection system 10. Such an arrangement may allow the fender 112 to be easily connected and removed from the side of a boat 72 or dock 70 during docking. In boating, a fender is a bumper used to absorb the kinetic energy of a boat or vessel berthing against a jetty, quay wall, dock, or adjacent vessel. Fenders, are used on all types of vessels, from cargo ships to cruise ships, ferries and personal yachts, to prevent damage to vessels and berthing structures. As shown in FIG. 46, the strap 18 may comprise a rope that may be connected to a male quick connector 12 at one end and another connector, such as a hooking mechanism 116 or quick-release connector at another end. Hooking mechanism 116 may comprise a carabiner, which may allow a user to connect the rope or strap 18 to another connector, such as a hook 114, for example, on a dock 70. In the example shown, the fender 112 is suspended from the male connector 12 via a strap 120, which may be a separate strap as 18 or may be part of strap 18. In other cases the fender 112 is suspended by the female socket 14. The system 10 may allow the fender 112 to be connected to the boat, for example prior to mooring.

Load securing, also known as cargo securing, is the securing of cargo for transportation. It has been estimated that up to 25% of accidents involving trucks can be attributable to inadequate cargo securing. Cargo that is improperly secured can cause severe accidents and lead to the loss of cargo, the loss of lives, the loss of vehicles, unintentional disclosure of a concealment, or cause environmental hazards. The most common method used to secure cargo is to use tie down straps. These straps (also called ratchet straps, lashing straps or tie downs) are fasteners used to hold down cargo or equipment during transport. Tie down straps are essentially webbing that is outfitted with tie down hardware. This hardware allows the tie down strap to attach to the area surrounding the cargo or equipment, loop over the cargo or equipment, and/or attach to the cargo or equipment. It usually also includes a method of tensioning the strap, such as a ratchet.

Figure 23:
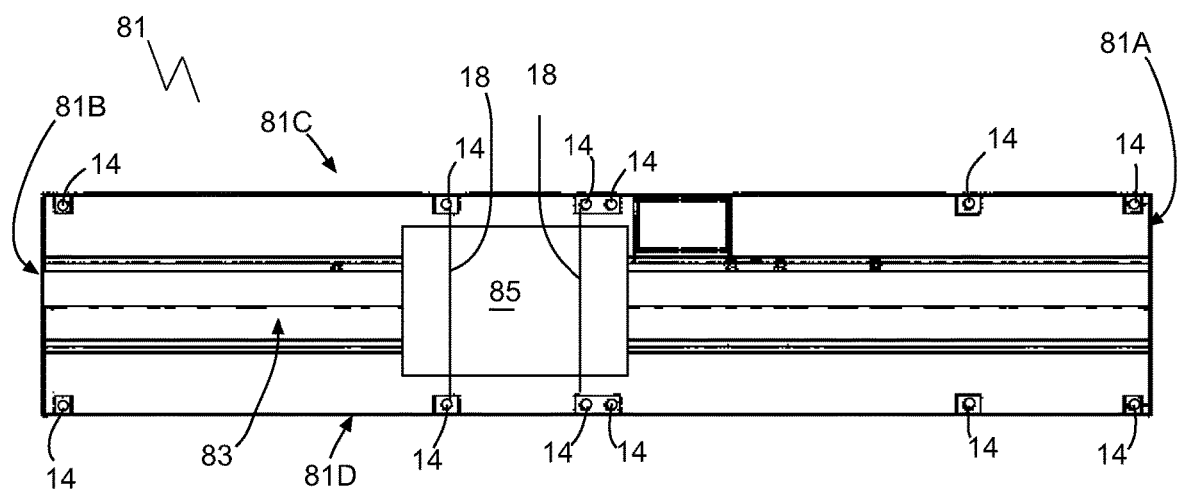
FIG. 23 is a top plan view of a flatbed of a truck illustrating strap connection points at various locations on the flatbed for securing a strap between plural connection points to secure a load.
Figure 24:
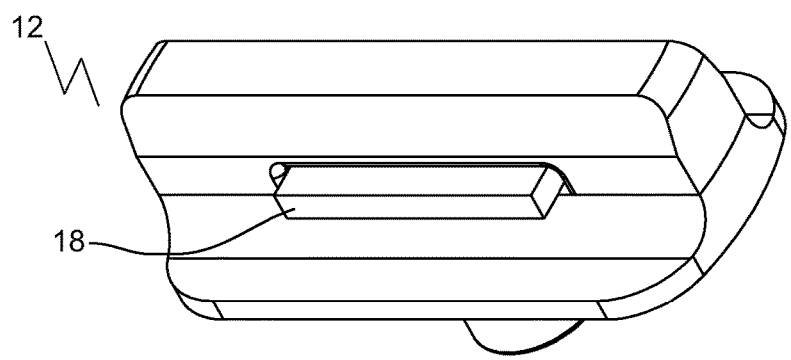
FIG. 24 is an upper perspective view of the male quick connector of another embodiment of a connector system.
Figure 25:
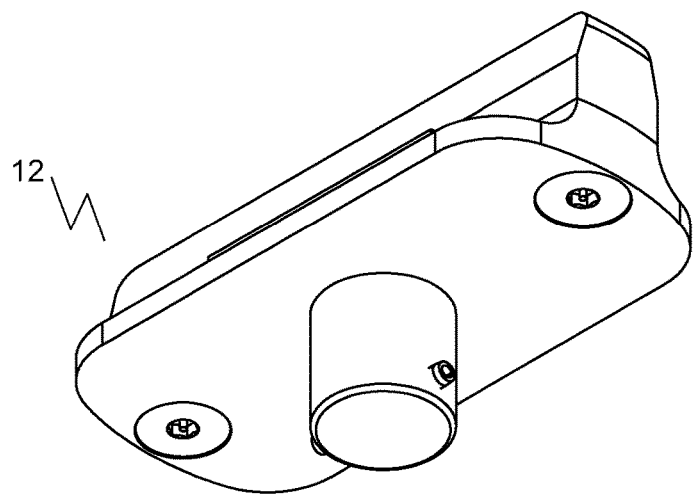
FIG. 25 is a base perspective view of the male quick connector of the connector system of FIG. 24.
Figure 26:
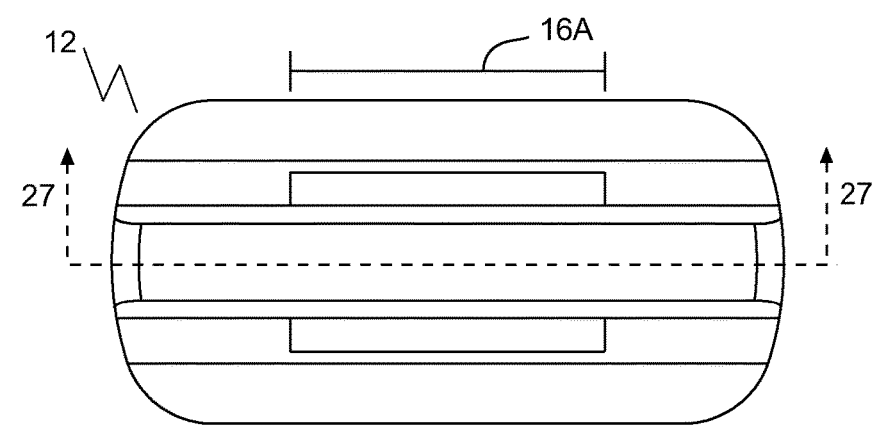
FIG. 26 is a top plan view of the male quick connector of the connector system of FIG. 24.
Figure 27:
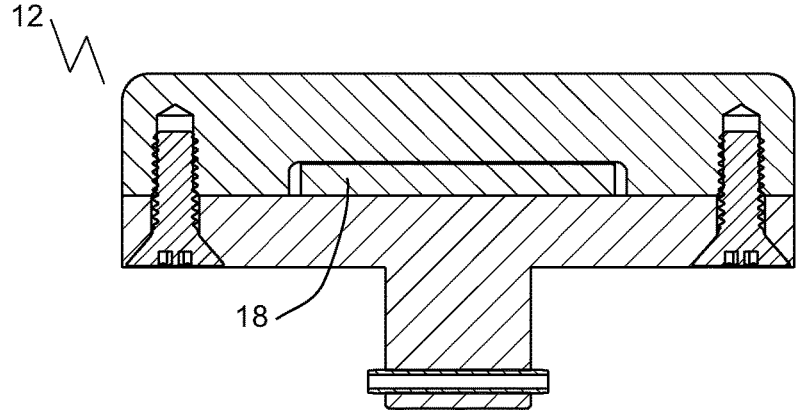
FIG. 27 is a section view taken along the 27-27 section lines from FIG. 26.
Figure 28:
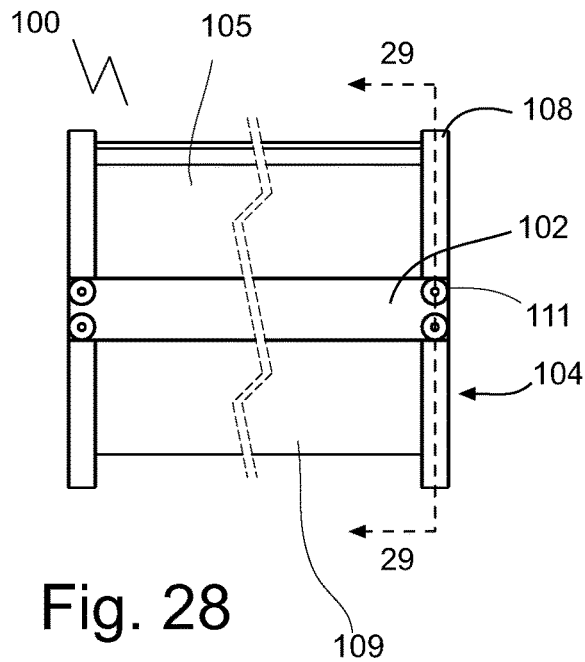
FIG. 28 is a side elevation view of an embodiment of a weight bar collar that may be used with a strap to perform exercises.
Figure 29:
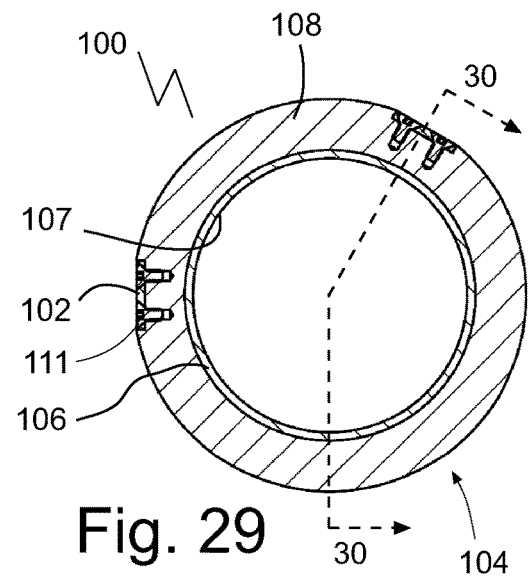
FIG. 29 is a section view taken along the 29-29 lines from FIG. 28.
Figure 30:
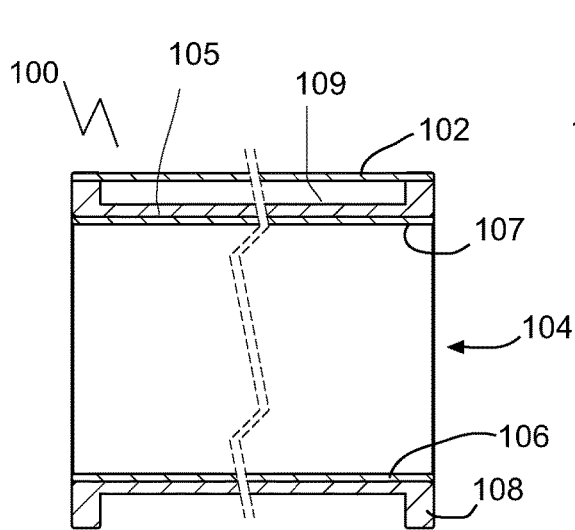
FIG. 30 is a section view taken along the 30-30 lines from FIG. 29
Figure 31:
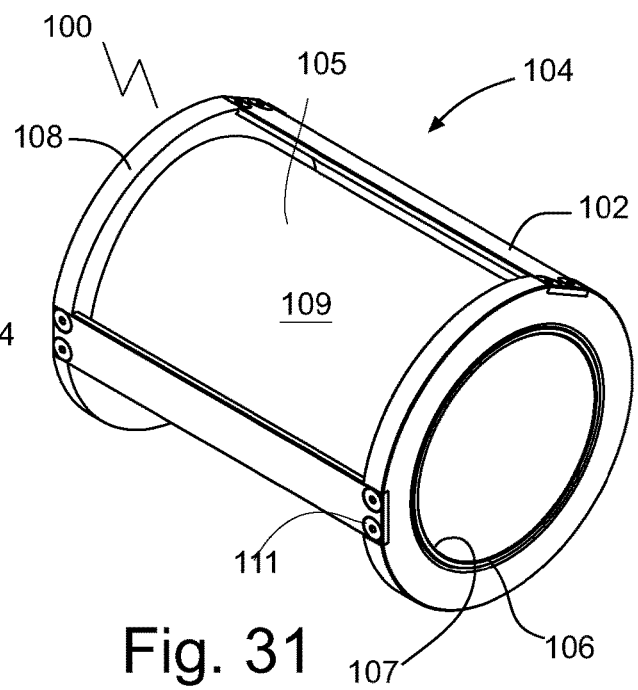
FIG. 31 is a perspective view of the weight bar collar of FIG. 28.
Figure 32:
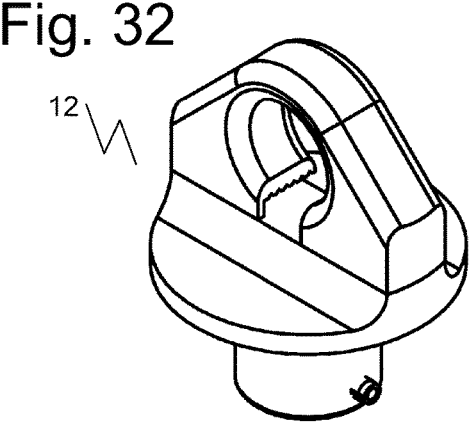
FIG. 32 is an upper perspective view of the male quick connector of another embodiment of a connector system.
Figure 33:
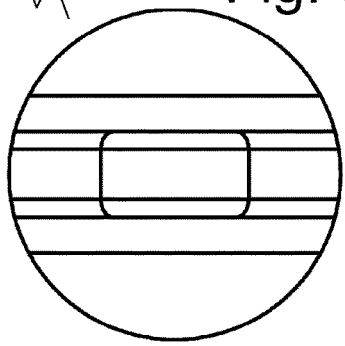
FIG. 33 is a top plan view of the male quick connector of the connector system of FIG. 32.
Figure 34:
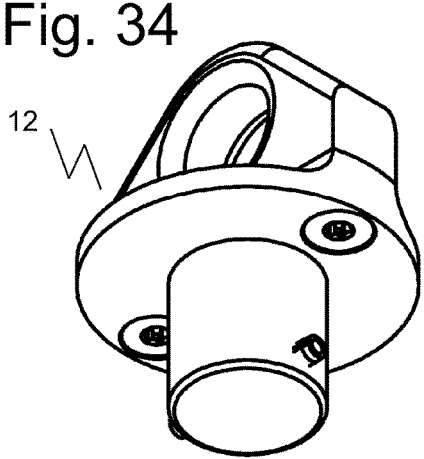
FIG. 34 is a base perspective view of the male quick connector of the connector system of FIG. 32.
Figure 35:
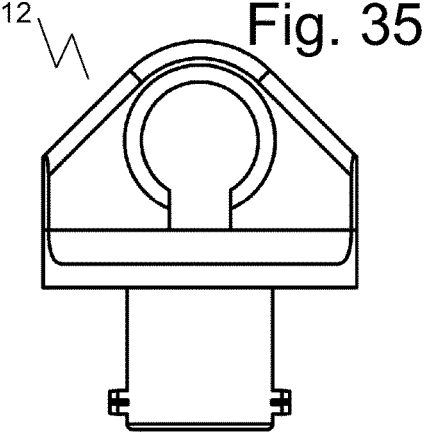
FIG. 35 is a side elevation view of the male quick connector of the connector system of FIG. 32.
Figure 36:
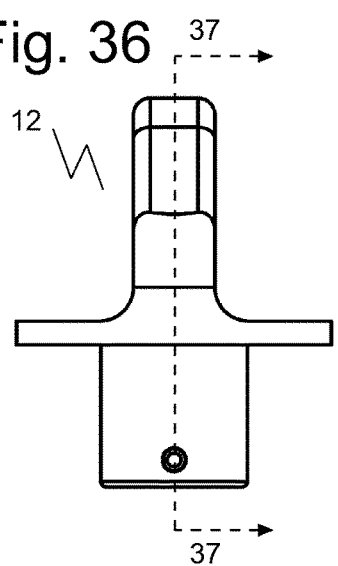
FIG. 36 is another side elevation view of the male quick connector of the connector system of FIG. 32.
Figure 37:
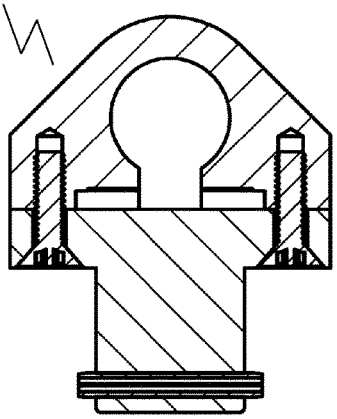
FIG. 37 is a section view taken along the 37-37 section lines from FIG. 36.
Figure 38:
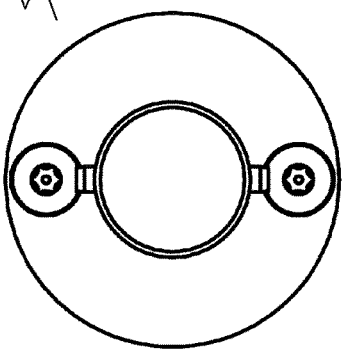
FIG. 38 is a bottom plan view of the male quick connector of the connector system of FIG. 32.
Figure 39:
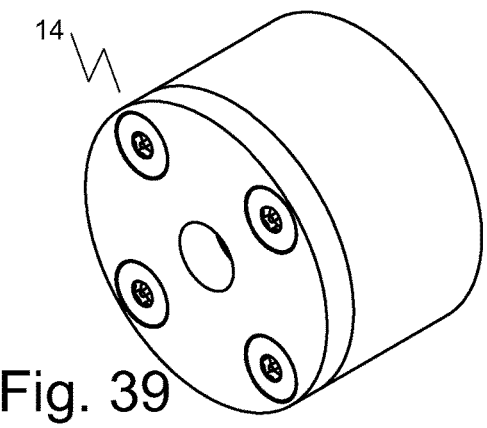
FIG. 39 is a perspective view of the female socket of another embodiment of a connector system.
Figure 40:
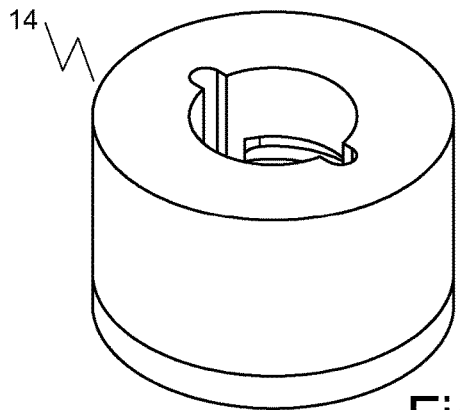
FIG. 40 is a perspective view of the female socket of the connector system of FIG. 39.
Figure 41:
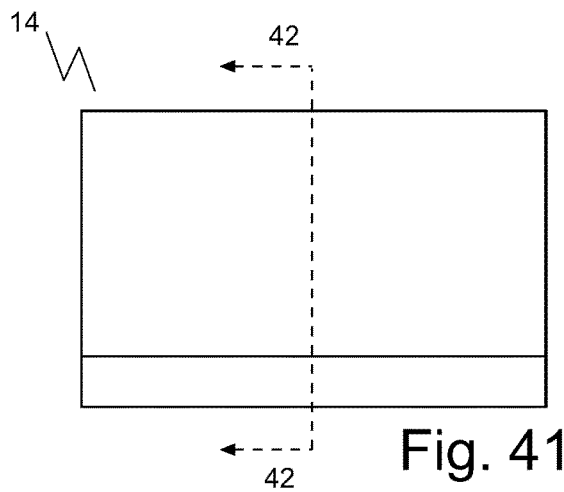
FIG. 41 is a side elevation view of the female socket of the connector system of FIG. 39.

Referring to FIG. 23 the connection system 10 disclosed here may be used to secure a cargo to a substrate 21, such as a plywood or other flatbed 81, or container, such as an intermodal container, as a rail-car, or any other type of freight transport system requiring load securement. The plurality of female sockets 14 may be mounted at different locations on the transport flatbed 81. For example, sockets 14 may be mounted at one or more of a front 81A, rear 81B, and sides 81C and 81D of the flatbed 81. Sockets 14 may also be mounted at a cargo zone 83 of the flatbed 81. Dual connector straps 18 may be used as shown for example when securing between two sockets 14 to secure cargo 85. Ratchets or other tightening devices may be provided on each strap 18 to tighten the strap 18 against the load in question.

In some cases the male connector 12 has no moving parts. In some cases the strap 18 connects to a greater structure, such as a tarp, fabric sheet, or other item. In some cases a strap 18 is clamped into the male connector 12. The plurality of female sockets 14 may be mounted on a panel to support temporary installation of the female sockets 14 on a substrate 21.

Referring to FIGS. 24-27 and 32-38, the male quick connector 12 may be formed in any of a variety of shapes and may include a variety of attachments to suit a particular function or strap. The aperture 16 may be structured to define an aperture width 16A that is sized for a particular strap. For example, the embodiment of male quick connector 12 illustrated in FIGS. 24-27, has an elongated shape suitable for securing a flat strap 18. Referring to FIGS. 32-38, the male connector 12 may be shaped to receive a strap that has a circular or elliptical cross-section, such as a rope or cable.

Referring to FIGS. 39-55, the female quick connector (socket 14) may be formed in any of a variety of shapes and may include a variety of attachments to suit a particular function or male quick connectors. In some cases the socket 14 may mount to a strap 18, with the male connector mounted to a substrate to receive the socket 14 and strap 18.

Figure 45:
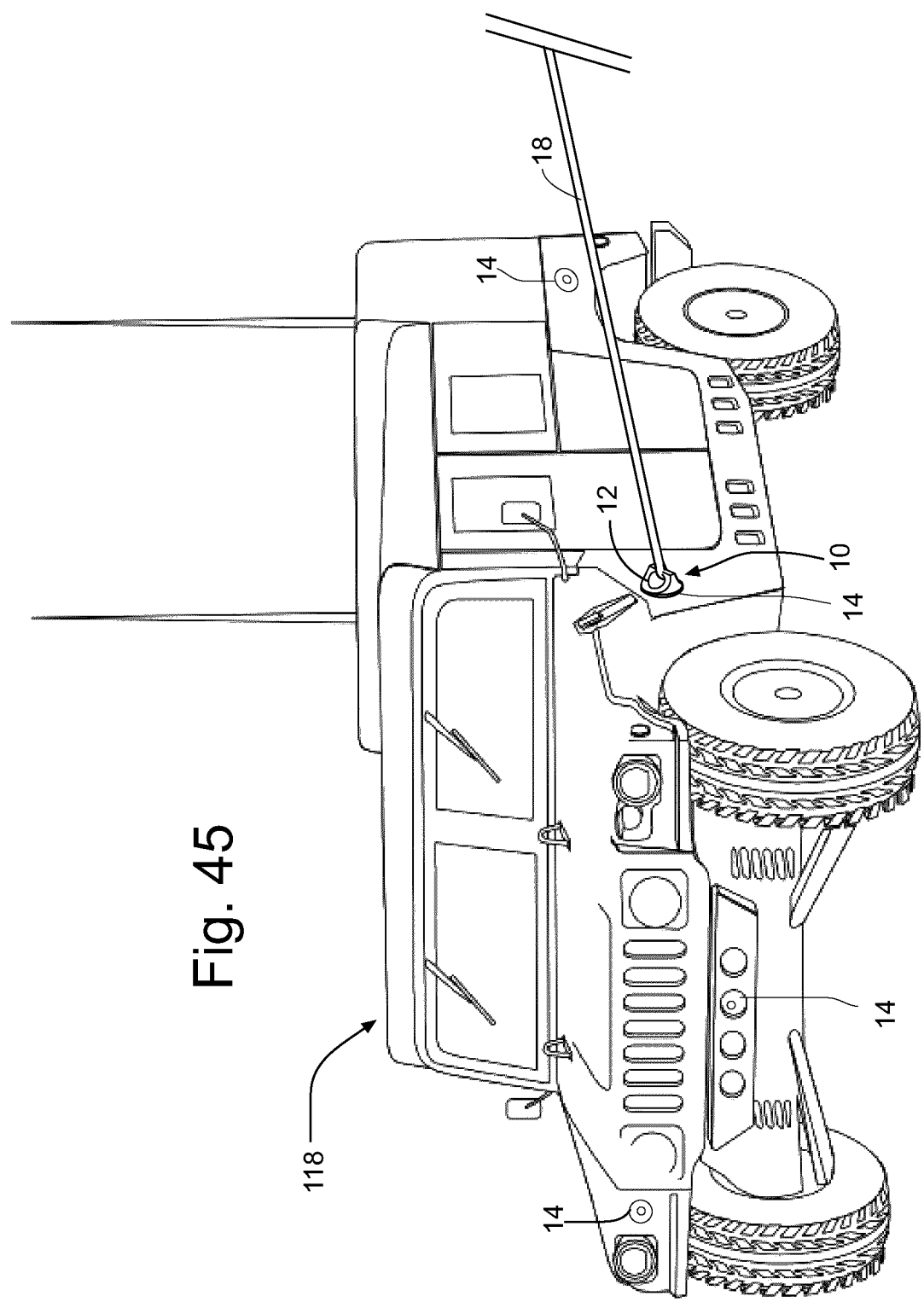
FIG. 45 is a perspective view of a military vehicle, namely a Humvee, with a connector system secured to a side wall in order tether a strap between the Humvee and an object (not shown).

Referring to FIG. 45, the connection system 10 may be mounted to a vehicle 118, such as a military vehicle or a Humvee as shown. A plurality of female sockets 14 may be located on the vehicle 118 such that connection system 10 may be connected to any part of the vehicle or other equipment. Thus, a user may connect a strap 18 to vehicle 118, for example the Humvee in a military embodiment, and thereafter use the strap 18 for a variety of training purposes, such as resistance band training exercises. For example, sockets 14 may be located at various locations around the vehicle, such as on the sides, front or rear of the vehicle 118. The above example provides a remote and convenient exercise system for use by military or others in remote locations without conventional workout facilities. The sockets 14 may be mounted on other suitable equipment, for example military equipment such as crates, boxes, fences, or walls, that would provide sufficient structural strength to permit such exercises to be performed. The connection system 10 may also be used as part of a winch or towing system to connect a tow cable to another vehicle or item to be towed by the vehicle 118 or to permit the vehicle 118 itself to be towed. When not in use the strap 18 and connector 12 (and other equipment such as handle grip 20 or bar 110) may be stored in the vehicle 118, for example in a pelican case. Other applications for the embodiments herein include installation on tour buses, vehicles, hockey or sports team buses, and others.

One or more buckles (not shown), such as D-rings, may be used for adjusting strap length. Beams and columns may connect via suitable mechanisms, such as by engagement of male and female parts, which may be locked in place by suitable mechanisms, such as pin locks, welding, interference fits, and others. Structural frame members may be formed by one or more columns or beams connected together.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A resistance strap exercise system comprising:
an elastomeric strap; and
a first connector, with the elastomeric strap being connected to the first connector; and
one or more second connectors anchored to a substrate, with each second connector structured to permit the first connector to interchangeably quick connect with and quick release from the second connector;
in which:
the first connector comprises a male connector;
each of the one or more second connectors comprise one or more female sockets, with each female socket structured to permit the male connector to interchangeably quick connect with and quick release from the female socket;
the male connector has a shaft with a radial latch part;
each female socket defines a slot shaped to receive the shaft and radial latch part, along a shaft axis of the shaft, at least when the shaft and radial latch part are angularly aligned with the slot; and
each female socket is structured to catch the radial latch part after insertion and rotation to prevent removal of the shaft from the slot.

2. The resistance strap exercise system of claim 1 further comprising:
a plurality of second connectors spaced from one another and anchored to the substrate.

3. The resistance strap exercise system of claim 1 in which:
a handle is connected to the elastomeric strap;
the handle comprises a weight bar, and further comprising:
a weight bar collar formed, on the weight bar, of a spool with a sleeve and opposed end flanges, the weight bar collar connected to the elastomeric strap; and
a locking part that extends between the opposed end flanges and is spaced over an external cylindrical surface of the sleeve to secure in use the elastomeric strap in between the locking part, the external surface, and the opposed end flanges.

4. The resistance strap exercise system of claim 1 in which:
a handle is connected to the elastomeric strap;
the handle comprises a weight bar, and further comprising:
a hook combined with the weight bar, the hook defining a strap passage, with a strap insertion slot that is sized to:
receive or release the elastomeric strap in a direction transverse the elastomeric strap when the elastomeric strap is in an elongated configuration under tension, and
block the elastomeric strap when the elastomeric strap is in a neutral configuration.

5. The resistance strap exercise system of claim 1 in which a handle is connected to the elastomeric strap.

6. The resistance strap exercise system of claim 4 in which the hook is combined with the weight bar via a collar around the weight bar.

7. A method of operating the resistance strap exercise system of claim 4 comprising:
applying tension to the elastomeric strap to place the elastomeric strap in the elongated configuration; and
passing the elastomeric strap in the direction transverse the elastomeric strap into or out of the strap passage via the strap insertion slot.

8. The resistance strap exercise system of claim 2 in which:
the one or more second connectors comprise a plurality of female sockets, with each female socket structured to permit the male connector to interchangeably quick connect with and quick release from the female socket.

9. The resistance strap exercise system of claim 8 in which, one or more of:
the plurality of female sockets are embedded within the substrate; and
the substrate is one or more of a wall, a floor, or a ceiling, of a room.

10. The resistance strap exercise system of claim 8 in which the substrate comprises an exercise rack.

11. The resistance strap exercise system of claim 10 in which the exercise rack is formed of beams and columns that form a cage defining an exercise zone.

12. The resistance strap exercise system of claim 11 in which the plurality of second connectors are spaced along the beams and columns of the cage.

13. The resistance strap exercise system of claim 2 in which the radial latch part comprises diametrically opposed radial latch pins.

14. The resistance strap exercise system of claim 13 in which each female socket comprises:
- a socket body that defines an axial bore, with the slot being defined axially through a plate that extends transversely across the axial bore; and
- in which an undersurface of the plate defines a stop for the radial latch part to prevent the radial latch part from aligning with the slot.

15. The resistance strap exercise system of claim 14 in which the undersurface defines an arcuate channel whose radial ends define the stop.

16. The resistance strap exercise system of claim 14 in which each female socket comprises a biasing device that biases the radial latch part into engagement with the undersurface.

17. The resistance strap exercise system of claim 16 in which the male connector is structured to quick release upon axially depressing the male connector further into the slot against the biasing force of the biasing device, and rotating the shaft such that the radial latch part aligns with the slot.

18. The resistance strap exercise system of claim 14 in which:
- a base of each female socket is defined by a base plate that is secured to the socket body;
- the base plate is secured to the socket body by a fastener; and
- the base plate defines a fastener bore, with the fastener bore being defined axially through the base plate and through which passes a fastener that anchors the base plate to the substrate.

19. The resistance strap exercise system of claim 8 in which the male connector receives the elastomeric strap through a strap aperture through the male connector.

20. The resistance strap exercise system of claim 8 in which:
- a handle is connected to the elastomeric strap;
- the handle comprises a weight bar; and
- the weight bar has a weight bar collar that connects to the elastomeric strap.

21. The resistance strap exercise system of claim 1 in which:
- a handle is connected to the elastomeric strap;
- the handle is formed of structural members that comprise a polymeric material that one or more of:
- is reinforced with carbon or glass fiber;
- comprises Nylon −6,6; or
- steel or aluminum.

* * * * *